US012671236B2

(12) United States Patent
Finn, III et al.

(10) Patent No.: US 12,671,236 B2
(45) Date of Patent: Jun. 30, 2026

(54) GROUNDED FOLDABLE ELECTRICAL CABLE CLAMP

(71) Applicant: Genwire LLC, Black Diamond, WA (US)

(72) Inventors: James Henry Finn, III, Graham, WA (US); Fraser McKay, Black Diamond, WA (US)

(73) Assignee: Gebwire LLC, Black Diamond, WA (US)

( * ) Notice: Subject to any disclaimer, the term of this patent is extended or adjusted under 35 U.S.C. 154(b) by 237 days.

(21) Appl. No.: 18/599,090

(22) Filed: Mar. 7, 2024

(65) Prior Publication Data

US 2024/0213749 A1 Jun. 27, 2024

Related U.S. Application Data

(63) Continuation-in-part of application No. 18/210,912, filed on Jun. 16, 2023, now Pat. No. 11,936,171, (Continued)

(51) Int. Cl.
*F16B 2/06* (2006.01)
*H02G 3/04* (2006.01)
*H02G 3/08* (2006.01)

(52) U.S. Cl.
CPC .............. *H02G 3/0406* (2013.01); *F16B 2/06* (2013.01); *H02G 3/08* (2013.01)

(58) Field of Classification Search
CPC ...... H02G 3/0406; H02G 3/0691; H02G 3/08; H02G 3/083; F16B 2/06
(Continued)

(56) References Cited

U.S. PATENT DOCUMENTS 5,094,578 A * 3/1992 Light ........................ F16B 2/10
248/74.5
5,374,017 A * 12/1994 Martin ..................... F16L 5/00
174/153 G
(Continued)

FOREIGN PATENT DOCUMENTS

KR 102011154 B1 8/2019

OTHER PUBLICATIONS

Carlton Connectors, 1/2 in. PVC Snap-In NM Connectors (Home Depot) Apr. 2022.
(Continued)

*Primary Examiner* — Michael F Mcallister
(74) *Attorney, Agent, or Firm* — Sierra IP Law, PC; Mark D. Miller

(57) ABSTRACT

Disclosed are methods and apparatus for providing and installing electrical wire connector clamps that may be inserted into knockout holes of an electrical box or panel, that are capable of holding multiple wires or cables, that may be run through the connector before it is slotted into the knockout hole, that may be used to ground the incoming cable to the electrical box or panel, and that use only a minimal amount of interior space of the electrical box or panel. Embodiments of the present invention include semi-cylindrical units that may be folded together around one or more wires for secure engagement of the wires to the knockout hole of an electrical box or panel, the units including a conductive metallic member extending from the inside of the unit to the outside of the unit to provide grounding between a cable or conduit inside the unit and the box or panel into which the unit is inserted.

20 Claims, 22 Drawing Sheets

Related U.S. Application Data which is a continuation of application No. 17/863,060, filed on Jul. 12, 2022, now Pat. No. 11,682,886.

(58) Field of Classification Search
USPC .......................................................... 174/50
See application file for complete search history.

(56) References Cited

U.S. PATENT DOCUMENTS

| | | | |
|---|---|---|---|
| 5,494,392 | A * | 2/1996 | Vogel ................... F16B 37/043 |
| | | | 411/908 |
| 6,043,432 | A | 3/2000 | Gretz |
| 6,682,355 | B1 | 1/2004 | Gretz |
| 6,737,584 | B2 | 5/2004 | Kiely |
| 6,827,604 | B1 | 12/2004 | White |
| 6,872,886 | B2 | 3/2005 | Kiely |
| 7,154,054 | B1 | 12/2006 | Gretz |
| 7,211,744 | B2 * | 5/2007 | Jorgensen .............. H02G 3/083 |
| | | | 16/21 |
| 7,329,144 | B1 | 2/2008 | Gretz |
| 7,390,979 | B1 | 6/2008 | Johnson |
| 7,824,213 | B1 | 11/2010 | Korcz et al. |
| 8,129,634 | B2 | 3/2012 | Sheehan et al. |
| 8,487,196 | B1 * | 7/2013 | Baldwin .............. H01R 13/585 |
| | | | 174/562 |
| 8,814,596 | B2 | 8/2014 | Millevik |
| 8,857,039 | B2 | 10/2014 | Sathyanarayana et al. |
| 9,373,919 | B1 | 6/2016 | Smith |
| 9,614,297 | B2 | 4/2017 | Boaz et al. |
| 9,705,296 | B1 | 7/2017 | Smith |
| 9,935,435 | B2 | 4/2018 | Smith |
| RE47,893 | E | 3/2020 | Chavan et al. |
| 10,593,445 | B2 | 3/2020 | Gretz |
| 10,897,127 | B2 * | 1/2021 | Korcz ................... H02G 3/085 |
| 2005/0227530 | A1 | 10/2005 | Castaldo et al. |
| 2008/0171464 | A1 | 7/2008 | Keeven et al. |
| 2012/0017029 | A1 | 1/2012 | Santos et al. |
| 2012/0276762 | A1 | 11/2012 | Hohner et al. |
| 2015/0090488 | A1 | 4/2015 | Laverdiere et al. |
| 2017/0018338 | A1 | 1/2017 | Antonucci |
| 2018/0351310 | A1 | 12/2018 | Gretz et al. |
| 2019/0207372 | A1 | 7/2019 | Korcz et al. |
| 2020/0194943 | A1 | 6/2020 | Jafari |
| 2021/0226393 | A1 | 7/2021 | Byrne |
| 2024/0022053 | A1 | 1/2024 | Finn et al. |

OTHER PUBLICATIONS

Bridgeport Connectors, 1/2 in. PVC Snap-In NM Connectors, Apr. 2022 (https://www.gordonelectricsupply.com/p/Bridgeport-616-Nmd-1-2-Nm-B-Connector/5773794?gclid=EAlaIQobChMI9Jn8_Obx-AlVIw_nCh1DyQpcEAQYAiABEgLk9fD_BwE).
Zoro non metallic plastic connector 3/4, Apr. 2022 (https://www.zoro.com/gampak-nm-plastic-connector-34-49741/i/G8623269/?q=G8623269).
Halex non metallic push-in connector 3/8 (Home Depot), Apr. 2022.
Inside the Box MC connector installation, Sep. 24, 2019 (https://www.youtube.com/watch?app=desktop&v=fXYVtTeaDu4).
Sigma Engineered Solutions NM Cable Connector 3/8 in. D 1 pk, Apr. 2022 (https://www.acehardware.com/departments/lighting-and-electrical/boxes-fittings-and-conduit/cable-connectors/3182805?gclid=EAlaIQobChMI7rG44ubx-AIVBhmtBh0ZVwKYEAQYASABEgKwKfD_BwE&gclsrc=aw.ds).
Arlington, SNAP2IT, MC Cable Connectors Catalog, 2015 (https://www.aifittings.com/media/spec-sheets/SNAP2IT.pdf).
Arlington SNAP2IT Connectors, Catalog p. E-1 (2022) (https://www.aifittings.com/media/catalog-pages/E-1.pdf).
Arlington Flex * AC * MC Fittings, 2024 (https://www.aifittings.com/catalog/flex-ac-mc/).
Grainger, Connectors for Flexible Metal Conduit, AC & MC Cable (2024) (https://www.grainger.com/category/electrical/conduit-fittings-strut-channel-framing/conduit-fittings/flexible-conduit-fmc-fnc-fittings/connectors-for-flexible-metal-conduit-ac-mc-cable?categoryIndex=2).
Grainger, Connectors for Non-Metallic Sheathed Cable & Flexible Cords (2024) (https://www.grainger.com/category/electrical/conduit-fittings-strut-channel-framing/conduit-fittings/flexible-conduit-fmc-fnc-fittings/connectors-for-non-metallic-sheathed-cable-flexible-cords?categoryIndex=6).
International Search Report and Written Opinion from co-pending application PCT/US2025/018606, Forms PCT/ISA/220, PCT/ISA/210, PCT/ISA/237 (May 21, 2025).

* cited by examiner

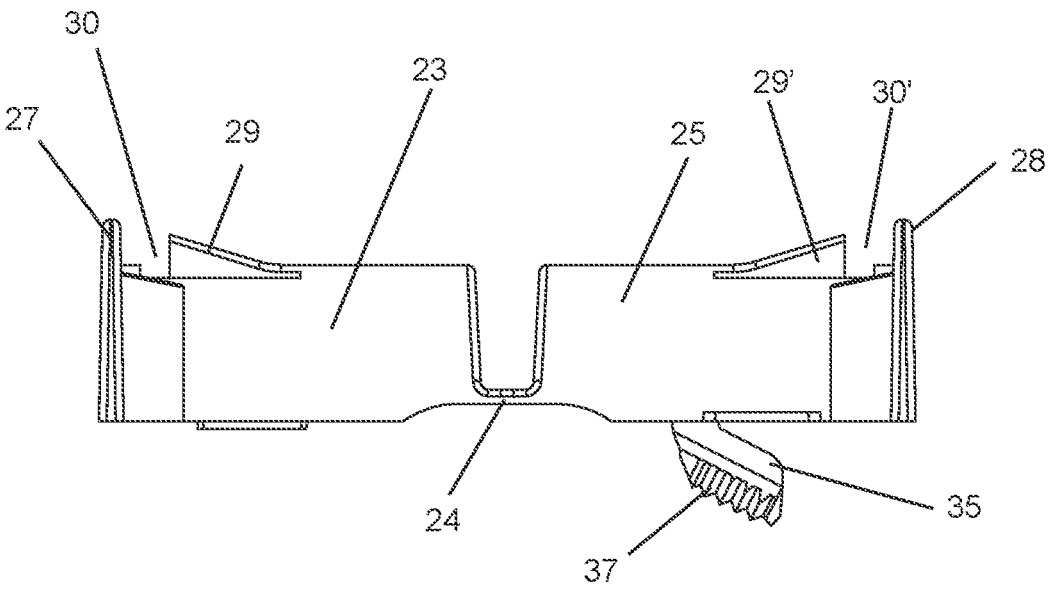
FIG. 3
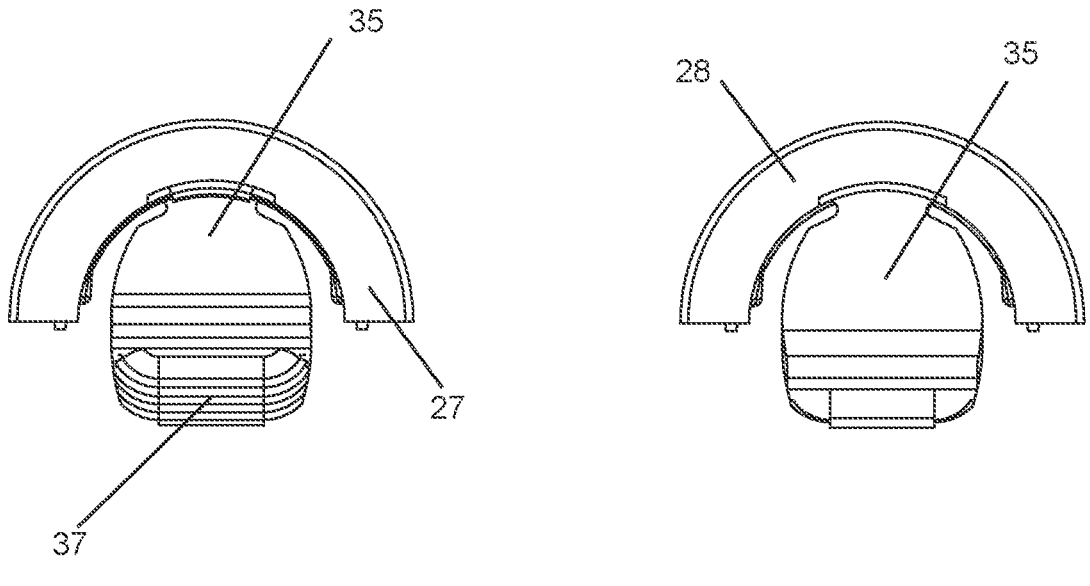
FIG. 4                                    FIG. 5

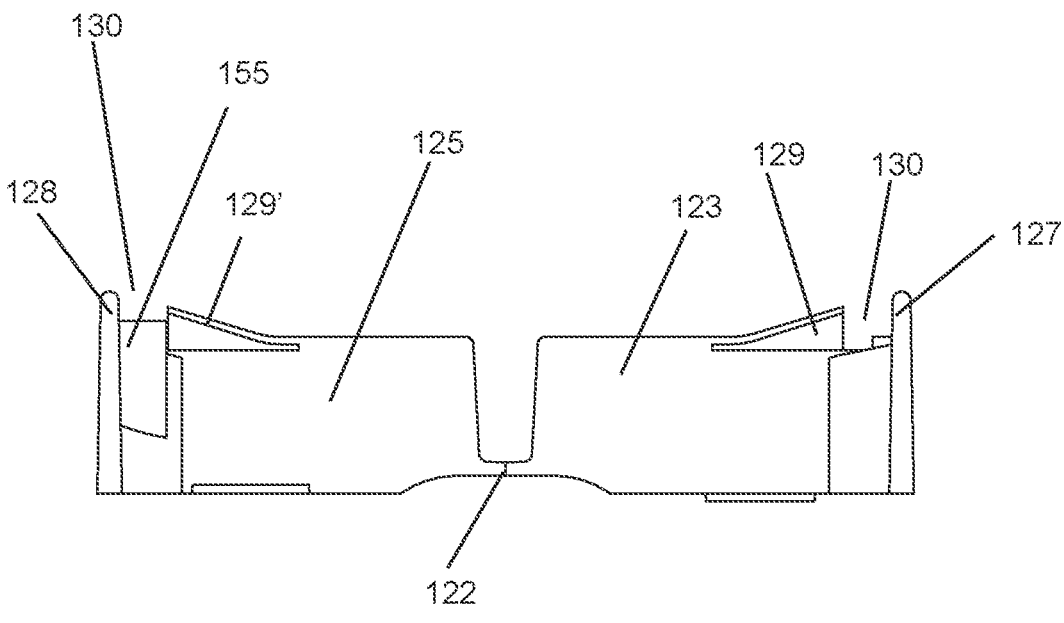
FIG. 17
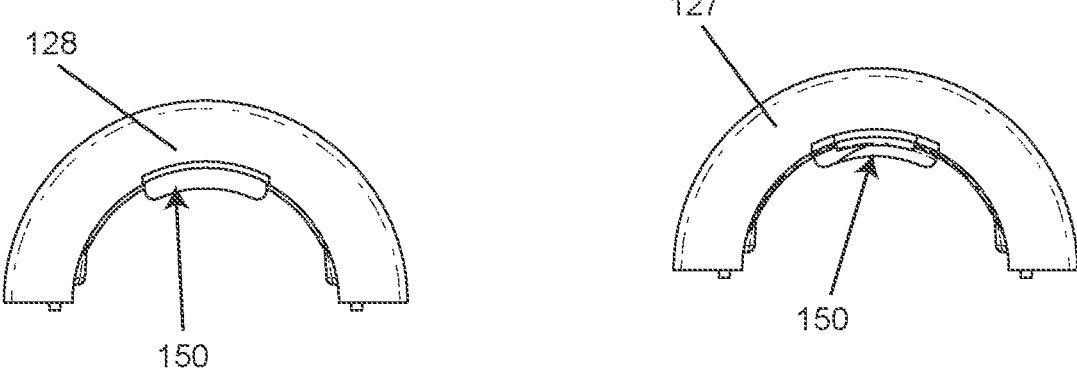
FIG. 18                            FIG. 19

SECTION<sub>A-A</sub>

DETAIL<sub>B</sub>

SCALE 1 : 1

DETAIL C
SCALE 1 : 1

GROUNDED FOLDABLE ELECTRICAL CABLE CLAMP

PRIORITY CLAIM

This is a continuation-in-part of U.S. patent application Ser. No. 18/210,912 filed on Jun. 16, 2023, which is a continuation of U.S. patent application Ser. No. 17/863,060 filed on Jul. 12, 2022, now U.S. Pat. No. 11,682,886 both of which are incorporated herein by this reference in their entireties.

BACKGROUND OF THE INVENTION

The present invention relates to installation of electrical cable and wiring in buildings and structures, and more particularly to fold over clamps for holding electrical cable or wire that may be engaged with the cable or wire and inserted into the wall of an electrical box, the clamps providing electrical conductivity from the inside of the clamps to the outside of the clamps to allow wires or cables inside the clamps to be grounded to the electrical box into which the clamps are inserted, and related apparatus, methods of use and methods of manufacture.

Electrical boxes are commonly used in the building industry to enclose sockets, switches, dimmers or other electrical components. During construction, electrical boxes and/or electrical panels are ordinarily attached to studs or wall frame members, and electrical wiring is run to each box. This wiring typically enters the box through a round opening in a side or end of the electrical box or panel known as a knockout, and leads from the component(s) inside the box to a source of power. For safety, security and code requirements, it is important to avoid having loose wires extending through the knockout holes in electrical boxes or panels. It is also important to be able to ground any wires or cables passing through such knockout holes to the electrical boxes themselves. As a result, various connectors have been developed that securely hold electrical wires and snugly fit into a knockout hole of an electrical box or panel.

Many existing electrical connectors are designed to be inserted into knockout holes from the outside. These connectors are useful for new construction since the connectors may be installed before any walls are attached, but they cannot be installed into existing walls without tearing out a portion of the wall outside of the electrical box or panel, which must then be repaired, retextured and repainted. This can be time consuming and costly, and can leave a scar on the repaired wall. To avoid this problem, other connectors have been developed that are capable of being inserted into a knockout hole from either the inside or the outside of the electrical box. However, in order to provide sufficient securement of the wires and also house the wire gripping apparatus, these connectors must be rigid and elongated, and ordinarily require that the wire be run through the connector before it is installed into the electrical box, limiting flexibility of use. The requirement to run the wire before inserting the connector, together with the rigidity of these connectors makes it difficult to use them with multiple wires, and also makes it extremely difficult to run a new wire to an existing electrical box through such a connector along with an existing wire already in place. Because of their design, existing non-metallic connectors require an electrician to slot the connector into the hole before running the cable through it, which can be a difficult, frustrating and time consuming process. In addition, one of the elongated ends of such connectors will necessarily protrude into the electrical box. This protrusion crowds the interior of the box, interfering with other wires and/or components inside the box, and potentially preventing the box from accepting larger components.

In commercial applications, the National Electrical Code (NEC) and National Fire Protection Association (NFPA) provide certain requirements for electric connectors, cables, conduit, and electrical boxes. Among other things, metal conduit is required to protect wiring from physical damage and from hazardous locations. In addition, all metallic objects associated with an electrical system should be at the same potential, such that in the event of a fault, a low-resistance path is provided for the current, which will trip a breaker and/or blow a fuse. In some cases, metal conduit itself can sometimes be used as the grounding path. In other cases, such as with certain types of flexible conduit, an additional grounding conductor is required inside the conduit.

It is therefore desirable to provide electrical wire connector clamps that may be installed into knockout holes from the inside of an electrical box or panel, that are capable of holding multiple wires or cables, that may be run through the connector before it is slotted into the hole, and that may be used to ground the wires or cables to the electrical box, and that use only a minimal amount of interior space of the electrical box or panel.

Embodiments of the present invention provide methods and apparatus which address these needs.

SUMMARY OF THE INVENTION

Embodiments of the present invention provide methods and apparatus for providing electrical wire connector clamps that may be installed into knockout holes from the inside of an electrical box or panel, that are capable of holding multiple wires or cables, that may be run through the connector before it is slotted into the hole, that may be used to ground the incoming cable to the electrical box, and that use only a minimal amount of interior space of the electrical box or panel. Embodiments of the present invention may be used in new construction, and to replace existing connector clamps in an electrical box or panel from the inside of the box or panel without damaging the walls surrounding the box or panel, in order to add new wire(s), hold multiple wires, and/or increase available space inside the box or panel.

Embodiments of the clamps of the present invention may include a semi-cylindrical unit (half pipe) having a convex exterior and a concave interior, a central opening bisecting the unit into halves, two hinge members at opposite ends of the central opening which connect the two halves together and one or more metallic members providing conductive electric communication (grounding) between the inside and the outside of the clamp. Folding the two halves of the unit together along the hinge members widens the central opening, and brings the two semi-cylindrical halves together to form a full cylinder having the central opening at one end, and forming a circular opening at the opposite end. Peripheral semi-circular ridges or flanges may be provided at opposite ends of the unfolded unit which form a circular ridge or annular flange around the opposite end opening when the two halves of the unit are folded together. In embodiments of the invention, one or more frictional gripping surfaces, structures or members may be provided on inside surfaces of the semi-cylindrical halves of the unfolded unit. These gripping surfaces, structures or members are designed to engage and secure one or more wires extending through the unit when the halves are folded together. One or more wires may be inserted through the central opening from either side of the unfolded unit. These wires are then securely gripped and extend through the circular opening formed when the halves of the unit are folded together. In some embodiments, the wires passing through the unit are contained within a metal cable or sleeve. For these situations, a conductive metallic member may be provided in one or both halves of the unit which extend(s) from inside the unit to its outside so as to provide electrically conductive communication (grounding) between the cable or sleeve carrying the wires and the electrical box itself.

In some embodiments, one or more outwardly extending longitudinal tapered tabs may be provided on the outside convex surfaces of the semi-circular halves of the unit, and a small gap may be provided between the edges of these tabs and the semi-circular flanges at each of the opposite ends of the unfolded unit. This gap should have approximately the same thickness as a wall of the electrical box. When a unit having these features is folded together into a cylinder forming the circular flange, the cylinder may then be inserted into a knockout hole of an electrical box from the inside of the box. When inserted, the longitudinal tabs snap through the knockout hole to the outside of the box, with the wall of the electrical box fitting into the gap between these tabs and the circular flange of the folded unit, thereby securely holding the unit in place with the circular flange flush against an inside surface of the box. The longitudinal tabs which hold the unit in the hole are designed so that the taper of the tabs helps squeeze the two halves of the unit together during insertion.

In some embodiments, interior wire gripping members may be provided in the form of one or more frictional surfaces on the inside concave edges of each of the semi-circular halves of the unit. In addition, or alternatively, the wire gripping members may be provided in the form of one or more frictional structures on the inside of each half. The frictional surfaces or structures may be the same, for example and without limitation, the surfaces or structures on both halves may be in the form of ridges, or the surfaces or structures on both halves may be in the form of teeth, etc. Alternatively, the surfaces or structures may be different on each half, for example, and without limitation, the surface(s) or structure(s) on one half may be in the form of ridges, while the surface(s) or structure(s) on the other half may be in the form of teeth, etc. Complementary surfaces or structures may be provided on each of the halves. For example, and without limitation, complementary ridges may be provided on the inside concave surfaces of each of the two halves. It is to be appreciated that frictional surfaces such as ridges or teeth may have different sizes and shapes to accommodate securing different sizes or numbers of wires. In some embodiments, the ridges, teeth, rough surfaces or frictional surfaces on each half may be directly across from and protrude out so that they come close to each other when the halves are closed, leaving a small gap for one or more wires to extend through. In these embodiments, different sized ridges, teeth, rough surfaces or frictional surfaces may be used to form different sized gaps for different sized or multiple wires. For example, and without limitation, larger ridges, teeth, rough surfaces or frictional surfaces may form smaller gaps for smaller wires; smaller ridges, teeth, rough surfaces or frictional surfaces may form wider gaps for larger or multiple wires. In some embodiments, the ridges, teeth, rough surfaces or frictional surfaces may be directly across from each other. In some embodiments, the ridges, teeth, rough surfaces or frictional surfaces may be staggered or offset from each other. In some embodiments, they may interleave when the halves are closed, causing the wires to follow a somewhat serpentine path.

In some embodiments, one or more gripping members may be provided on the inside of one or both of the halves of the connector clamp units which protrude out therefrom. In some embodiments, a gripping member may be in the form of a finger extending outwardly from the inside concave surface of one of the halves of an unfolded unit. The proximal end of the finger may be flexibly attached to the inside surface of the half in such a way that it is flexibly urged outward away from the unit. The distal end of the finger may be provided with a frictional surface which may be in the form of ridges, teeth, rough surface or another frictional pattern. A complementary frictional surface may be provided on the inside concave surface of the other half of the unit, and may also be in the form of ridges, teeth, rough surface, or other frictional pattern. The complementary frictional surface need not be the same as the frictional surface of the finger, and it may but need not be directly across from the finger when the unit is folded closed. For example, and without limitation, the frictional surface on the finger may be in the form of teeth, and the complementary surface on the convex interior of the other half may be in the form of ridges. In other embodiments, the frictional surface at the end of the finger may be offset from the frictional surface on the inside of the opposite half. In other embodiments more than one frictional surface may be provided on the opposite half from the finger for multiple engagements with wires extending through the unit. In these embodiments, when the halves are closed, the frictional surface of the finger is urged toward the inside surface of the other half of the unit. In some embodiments, in the absence of any wires, the frictional surface of the finger may touch a frictional surface of the opposite half when the unit is folded together. When one or more wires are present, the flexibility of the finger allows the wires to be gripped between the frictional surfaces at the end of the finger and those on the inside surface of the opposite half.

In some embodiments, a gap may be provided between the frictional surface of the finger and the frictional surface (s) of the opposite half when the halves are folded together. In these embodiments, the size of the finger may be varied to create different sized gaps to accommodate different sized wires. For example, and without limitation, a longer finger may be provided to create a smaller gap for smaller wires, and a shorter finger may be provided to create a larger gap for larger or multiple wires.

In alternative embodiments, multiple flexibly attached fingers may be provided. For example, and without limitation, one finger may be provided on the inside concave surface of each half of a unit. In these embodiments, the fingers may touch each other when the unit is folded closed, or they may be offset so as not to interfere with each other. In other embodiments, two fingers may be provided in one half of a unit, with no fingers in the other half of the unit. It is to be appreciated that different combinations of multiple fingers may be provided in different embodiments, and that they may or may not touch, and may or may not be offset from each other when the unit is closed. It is also to be appreciated that in multiple finger embodiments, the fingers may be provided with the same or different frictional surfaces, and the same or different frictional surfaces may be provided on the opposite half from the finger, which may or may not be offset or staggered from the finger(s).

In some embodiments, the clamps of the present invention may be specialized for securing a flexible metallic electrical conduit or AFC to an electrical box in commercial applications. In such embodiments, the clamps of the present invention may be provided with one or more conductive metallic surfaces, structures, or members that may be provided on one or both of the inside surfaces of the semi-cylindrical halves of the unfolded unit and extend to the exterior of the unit, to provide grounding from the inside to the outside of the unit. The conductive grounding surface(s), structure(s), or member(s) are designed to engage and securely contact a metallic electrical conduit extending through the unit when the halves are folded together. One or more wires may be housed within the metallic electrical conduit, and the conduit size may be selected to match the interior diameter of the folded unit, or vice versa. The interior grounding surfaces, structures, or members may extend to or be in communication with the exterior of the unit for conductivity. For example and without limitation, an interior grounding structure may extend through an opening in the unit and be part of or may be connected to a grounding clip on the exterior of the unit such that when the unit is folded around a metallic conduit and inserted into a knockout hole, the grounding surfaces, structures, or members provide electrically conductivity (grounding) between the metallic conduit inside the unit and to the knockout hole in the electrical box into which the unit is inserted.

In some embodiments, the grounding member may have a metal construction that is suitable for electronic conduction and may be provided in the form of one or more peak and grooved frictional surfaces on the inside concave edges of at least one of the semi-circular halves of the unit. In addition, or alternatively, the grounding member may be provided on the inside concave edge of each semi-circular halves of the unit. The grounding member surfaces or structures may be the same, for example, and without limitation, the surfaces or structures on both halves may have a constant helical path and profile forming a plurality of peaks and grooves. In other embodiments, the grounding surfaces or structures on one or both halves may have cutouts with a shape that is complementary to the exterior surface of the flexible metallic conduit cable. Alternatively, the grounding surfaces or structures may be different on each half, for example, and without limitation, the surface(s) or structure(s) on one half may be in the form of a plurality of peaks and grooves, while the surface(s) or structure(s) on the other half may be flat, concave, or in the form of ridges, etc. Complementary surfaces or structures may be provided on one or both of the halves of the unit. One or more recesses may be provided in one or both of the halves of the unit to receive the grounding surface(s) or structure(s). One or more openings may be provided in the unit through which the grounding surface(s) or structure(s) may extend from the interior to the exterior of the unit.

Different embodiments of the present invention may accommodate any or all of the following cable sizes: 14/2, 14/3, 14/2×2 (a double run of 14/2), 12/2, 12/2×2, 12/3, 10/2, 10/3 in addition to others. Different embodiments of the present invention may accommodate any or all of the following Armored Flexible Conduit sizes: ⅜ in., ½ in., ¾ in., 1 in., 1¼ in., 1½ in., and 2 in., in addition to others.

Embodiments of the units of the present invention may be provided in the form of a single molded piece made of rigid plastic or other similar material, which may have one or more interior slots or recesses to receive one or more metallic grounding structures, and one or more openings in the molded piece through which the grounding structure extends from the interior to the exterior of the molded piece. The material at the edges of the central opening may be thinner than other parts of the unit in order to allow these areas to be deformable and act as hinges when the halves of the unit are folded together to form a cylinder. Similarly, the material attaching the outwardly extending longitudinal tabs to the outside surfaces of the unit may be thinner than other parts of the unit to allow this material to deform slightly allowing the tabs to move and then pop back into place when they are inserted through a knockout hole in an electrical box.

In other embodiments, the units of the present invention may be provided as two distinct halves that are assembled together. The two halves may have complementary edges where they are joined at the ends of the central opening, with the edges snapping together to form a pair of pivots at either end of the central opening. These pivots allow the two halves to be folded together to form a cylinder. In other embodiments, the two halves may be fastened together using separate hinges or pivot members attached at each end of the central opening that allow the halves to be folded together to form a cylinder.

In an exemplary installation, one or more wires are to be run into an electrical box. The wires are first passed from the outside of the electrical box to the inside of the box through a knockout hole. The wires are then threaded through the central opening of an unfolded unit. Since the unit will eventually be folded and inserted into the knockout hole, the wires should be threaded into the central opening such that the outside (convex side) of the unfolded unit faces and is closest to the knockout hole. The unit is moved along the wires to a position that provides a desired amount of slack on the inside of the electrical box. The semi-circular halves of the unit are then folded together to form a cylinder around the wires. This causes the frictional surface(s), structure(s) or member(s) inside the unit to firmly grip the wires extending therethrough. The unit, now firmly secured to the wires, is then pushed through the knockout hole from which the wires enter the unit, causing the longitudinal tabs to pop through the hole, leaving only the flush circular flange of the unit on the inside of the box around the knockout hole. It is to be appreciated that the engagement of the longitudinal tabs and the circular ridge with the knockout hole in the electrical box keeps the two halves of the unit securely engaged with each other and with the electrical box, thereby securely holding the wires contained therein. If grounding is desired, for example, if the wires are provided inside a flexible metallic conduit, embodiments of the invention may include one or more metallic grounding surfaces inside the cylinder that extending through the unit to the exterior. The grounding surface(s) inside the unit make(s) contact the metallic conduit, and the grounding surface(s) on the exterior make(s) contact with the electrical box, and provide electrical communication from the inside to the outside of the cylinder, in order to ground the metallic conduit to the electrical box.

In one aspect, the invention includes a wire clamp for use with an electrical box comprising a semi-cylindrical unit having a convex exterior surface and a concave interior surface; a central opening bisecting the unit into a first semi-cylindrical half and a second semi-cylindrical half, with two hinge members located at opposite ends of the central opening which movably connect the first and second halves together; a first semi-circular peripheral flange is located at an open end of the first half opposite from the central opening, and at least one deformable tapered tab is located on the exterior surface adjacent to the first peripheral flange; a second semi-circular peripheral flange is located at an open end of the second half opposite from the central opening, and at least one second deformable tapered tab is located on said exterior surface adjacent to the second peripheral flange; and at least one frictional member provided on an interior surface of at least one of the semi-cylindrical halves of said unit.

In another aspect, methods are provided for securely holding one or more wires in an electrical box by first passing at least one wire from outside the electrical box to an inside of the box by extending an end of the wire through a knockout hole in the box; then passing the end of the wire through a central opening of a semi-cylindrical unit having a convex exterior side and a concave interior side such that the end of the wire is on the concave interior side of the unit, the opening bisecting the unit into a first semi-cylindrical half and a second semi-cylindrical half, the unit having two hinge members located at opposite ends of the central opening which movably connect the first and second halves together, the unit having at least one frictional surface, structure or member on said concave interior side; then folding the two semi-cylindrical halves together to form a cylinder around the wire such that the frictional surface, structure or member firmly engages the wire; and then inserting the formed cylinder into the knockout hole. In other aspects, semi-circular flanges are provided at opposite ends of the unit such that a circular flange is formed during the step of folding the two semi-cylindrical halves together. In other aspects, the circular flange is flush against an inside surface of the box after the formed cylinder is inserted into the knockout hole. In other aspects, at least one deformable tab is provided on the convex side of the unit adjacent to each of the semi-circular flanges, such that when the formed cylinder is inserted into the knockout hole, the tabs deform and then pop back such that the semi-circular flanges and the tabs hold the cylinder in place in the knockout hole.

In another aspect, the invention includes a wire clamp apparatus for use with an electrical box or panel comprising a first semi-cylindrical part having a first concave interior surface, a first convex exterior surface, and a first flange located at an end thereof on said first exterior surface; a second semi-cylindrical part having a second concave interior surface, a second convex exterior surface, and a second flange located at an end thereof on said second exterior surface; and a pair of deformable members provided at opposite ends of said first and second parts that movably connect said first and second parts together wherein an opening is provided between said pair of deformable members.

In another aspect, the invention includes a wire clamp apparatus for use with an electrical box or panel comprising a first semi-cylindrical part having a first concave interior surface, a first convex exterior surface, and a first flange located at an end thereof on the first exterior surface; a second semi-cylindrical part having a second concave interior surface, a second convex exterior surface, and a second flange located at an end thereof on the second exterior surface; a pair of deformable members provided at opposite ends of the first and second parts that movably connect the first and second parts together wherein an opening is provided between the pair of deformable members; and a conductive metallic (grounding) member having a first portion provided on the concave interior surface of at least one of the semi-cylindrical parts and extending through an opening in the at least one part to a second portion on the convex exterior surface thereof.

In related aspects, the clamp apparatus may further comprise a gripping member provided on an interior surface of at least one of the semi-cylindrical parts; the second portion of the metallic member may comprise a clip positioned adjacent to the exterior flange on the exterior surface of the at least one part; the first portion of the metallic member may comprise a concave surface; the first portion of the metallic member may comprise a sleeve having a plurality of peaks and grooves thereon; the peaks and grooves of the first portion of the metallic member may be complementary to peaks and grooves on an outer surface of a flexible metallic conduit inserted into the clamp; the first portion of the metallic member may make firm contact with the conduit when the first semi-circular part and second semi-cylindrical part are engaged together around the conduit; a recess may be provided in the interior concave surface of the at least one part for receiving the first portion of the metallic member; a recess may be provided in the exterior convex surface of the at least one part for at least partially receiving the second portion of the metallic member. In some aspects, a second conductive metallic (grounding) member may be provided on the concave interior surface of the other of the at least one semi-cylindrical parts, the second conductive member extending through a second opening in the other part to the convex exterior surface thereof.

In another aspect, the invention may include an electrical clamp for grounding a metallic conduit to an electrical box, comprising: a foldable semi-cylindrical unit having a convex exterior surface and a concave interior surface, a central opening bisecting the unit into semi-cylindrical halves, and two hinge members located at opposite ends of the central opening which connect the two halves together; and a conductive metallic (grounding) member having a first portion located on the concave interior surface of at least one of the semi-cylindrical halves and having a second portion extending through an opening in the at least one semi-cylindrical half to the convex exterior surface thereof.

In related aspects, the invention may include a gripping member provided on an interior surface of at least one of the semi-cylindrical halves; the first portion of the metallic member may comprise a sleeve having a plurality of peaks and grooves thereon; the peaks and grooves of the first portion of the metallic member may be complementary to peaks and grooves on an outer surface of the metallic conduit; a second conductive metallic (grounding) member may be provided on the concave interior surface of the other of the at least one semi-cylindrical halves, the second conductive member extending through a second opening in the other half to the convex exterior surface thereof.

In some aspects, a method for securely holding and grounding a flexible metallic conduit in an electrical box is provided comprising the steps of: passing the metallic conduit from outside the electrical box to an interior of the box by extending an end of the conduit through a knockout hole in the box; passing the end of the conduit on the interior of the box through a central opening of a semi-cylindrical unit having a convex exterior surface and a concave interior surface, the opening bisecting the unit into a first semi-cylindrical half and a second semi-cylindrical half, the unit having two hinge members located at opposite ends of the central opening which movably connect the first and second halves together; aligning the conduit with a conductive metallic (grounding) member having a first portion located on the concave interior surface of at least one of the semi-cylindrical halves, the conductive member extending through an opening in the at least one semi-cylindrical half to a second portion on the convex exterior surface thereof; folding the two semi-cylindrical halves together using the hinges to form a cylinder around the conduit; and inserting the formed cylinder into the knockout hole.

In related methods, the first portion of the metallic member may make conductive contact with the conduit when the first semi-circular part and second semi-cylindrical part are engaged together around the conduit, and the second portion of the metallic member may make conductive contact with the knockout hole when the cylinder is inserted therein. In some methods, an exterior surface of the conduit may comprise peaks and grooves, and the conductive metallic member may comprise complementary peaks and grooves, and the step of aligning the metallic member with the conduit includes positioning at least one peak of the metallic member with at least one groove of the conduit and positioning at least one groove of the metallic member with at least one peak of the conduit. In some methods, a gripping member may be provided on an interior surface of at least one of the semi-cylindrical halves. In some methods, a second conductive metallic (grounding) member may be provided on the interior surface of the other of the semi-cylindrical halves, the second conductive member extending through a second opening in the other half to the convex exterior surface thereof.

In other aspects, a grounding member may extend from inside to outside of at least one of the semi-circular halves, or the grounding member may be in communication with a metallic clip positioned between the flange and the deformable tapered tab on at least one of said semi-cylindrical halves of said unit. The grounding member may be provided in the form of a metal sleeve having a plurality of peaks and grooves. The plurality of peaks and grooves may have a constant profile and a spiral pitch that is complementary to an outer surface of a flexible conduit. The flexible conduit may be operable to house at least one wire, the conduit being fixed to the grounding member when the first semi-circular half and second semi-cylindrical half are movably connected together. In some aspects, the grounding member groove may be operable to align with a peak of the flexible conduit, and the grounding member peak may be operable to align with a groove of the flexible conduit. The grounding member clip may be operable to electrically ground the flexible conduit to the electrical box when the unit is secured to the electrical box.

In another aspect, the invention includes an electrical cable clamp for securing an AFC conduit to an electrical box, comprising a foldable semi-cylindrical unit having a convex exterior and a concave interior, a central opening bisecting the unit into halves, and two hinge members at opposite ends of the central opening which connect the two halves together; a grounding member operable to electrically connect the AFC conduit to the electrical box, the grounding member being positioned on an inside surface of at least one of the semi-cylindrical halves and designed to engage and secure the AFC conduit when the halves are folded together; one or more outwardly extending longitudinal tapered tabs on the outside convex surfaces of the semi-circular halves of the unit, and a small gap provided between the edges of these tabs and the semi-circular flanges at each of the opposite ends of the unfolded unit, the gap having approximately the same thickness as a wall of the electrical box; and wherein folding the two halves of the unit together widens the central opening, and brings the two semi-cylindrical halves together to form a full cylinder having the central opening at one end, and forming a circular opening at the opposite end, and wherein the cylinder may be inserted into a knockout hole of an electrical box from the inside of the box, the longitudinal tabs snapping into place with the wall of the electrical box fitting into the gap between these tabs and the circular flange of the folded unit, thereby securely holding the unit in place with the circular flange flush against an inside surface of the box, and the grounding member electrically connecting the AFC conduit to the electrical box.

In another aspect, methods for securely holding a flexible conduit housing one or more wires in an electrical box by first passing at least one flexible conduit from outside the electrical box to an interior of the box by extending the end of the at least one flexible conduit through a knockout hole in the box; passing the end of the at least one flexible conduit on the interior of the box through a central opening of a semi-cylindrical unit having a convex exterior surface and a concave interior surface, the opening bisecting the unit into a first semi-cylindrical half and a second semi-cylindrical half, the unit having two hinge members located at opposite ends of the central opening which movably connect the first and second halves together; aligning a grounding member with an exterior surface of the at least one flexible conduit, the grounding member positioned on the interior surface at least one of the semi-cylindrical halves and including a plurality of peaks and grooves; folding the two semi-cylindrical halves together using the hinges to form a cylinder around the at least one flexible conduit; and inserting the formed cylinder into the knockout hole. In other aspects, the flanges are provided at opposite ends of said unit, preventing the formed cylinder from passing through the knockout hole. The aligning a grounding member with the flexible conduit may include positioning at least one peak of the grounding member with a groove of the flexible conduit and positioning at least one groove of the grounding member with a peak of the flexible conduit. The grounding member may include a grounding clip provided on the convex surface of said first semi-cylindrical half and adjacent to said flange. In other aspects, the deformable tab may be provided on the convex surface of the first semi-cylindrical half adjacent to the grounding clip and a second deformable tab is provided on the convex surface of the second semi-cylindrical half adjacent to said flange, such that when the formed cylinder is inserted into the knockout hole, the tabs deform and then pop back such that the flanges and the adjacent tabs hold the cylinder in place and electrically grounds said grounding clip to the knockout hole.

It is therefore an object of the present invention to provide electrical wire connector clamps that may be installed into knockout holes from the inside of an electrical box or panel to provide grounding between a conduit carrying the wires and the electrical box.

It is also an object of the present invention to provide electrical wire connector clamps that use only a minimal amount of interior space inside the electrical box or panel.

It is also an object of the present invention to provide electrical wire connector clamps that are capable of holding single or multiple wires.

It is also an object of the present invention to provide electrical wire connector clamps that may be retrofitted into an existing electrical box or panel without damaging existing adjacent walls.

It is also an object of the present invention to provide electrical wire connector clamps that may be used for holding new wires added to an installed electrical box or panel through the same knockout hole as existing wires.

It is also an object of the present invention to provide electrical wire connector clamps that are easily manufactured, installed and removed.

It is also an object of the present invention to provide methods for installing and using electrical wire connector clamps in either new or existing construction.

It is also an object of the present invention to provide electrical wire connector clamps that may be used for holding a flexible metallic conduit containing a plurality of wires to an installed electrical box or panel, and grounding the metallic conduit to the electrical box or panel.

It is also an object of the present invention to provide methods that give an electrician the option of either slotting a connector clamp of the present invention into a knockout hole before inserting wires or cables, or running the wires or cables through a connector clamp of the present invention and then slotting it into the knockout hole.

Additional objects of the invention will be apparent from the detailed descriptions and the claims herein.

BRIEF DESCRIPTION OF THE DRAWINGS

FIG. 3 is a side view of an embodiment of the present invention in an unfolded state.

FIG. 4 is an end view of an embodiment of the present invention in an unfolded state.

FIG. 5 is an opposite end view of an embodiment of the present invention in an unfolded state.

FIG. 17 is a side view of the embodiment of FIG. 15 in an unfolded state.

FIG. 18 is an end view of the embodiment of FIG. 15 in an unfolded state.

FIG. 19 is an opposite end view of the embodiment of FIG. 15 in an unfolded state.

DETAILED DESCRIPTION

Figure 1:
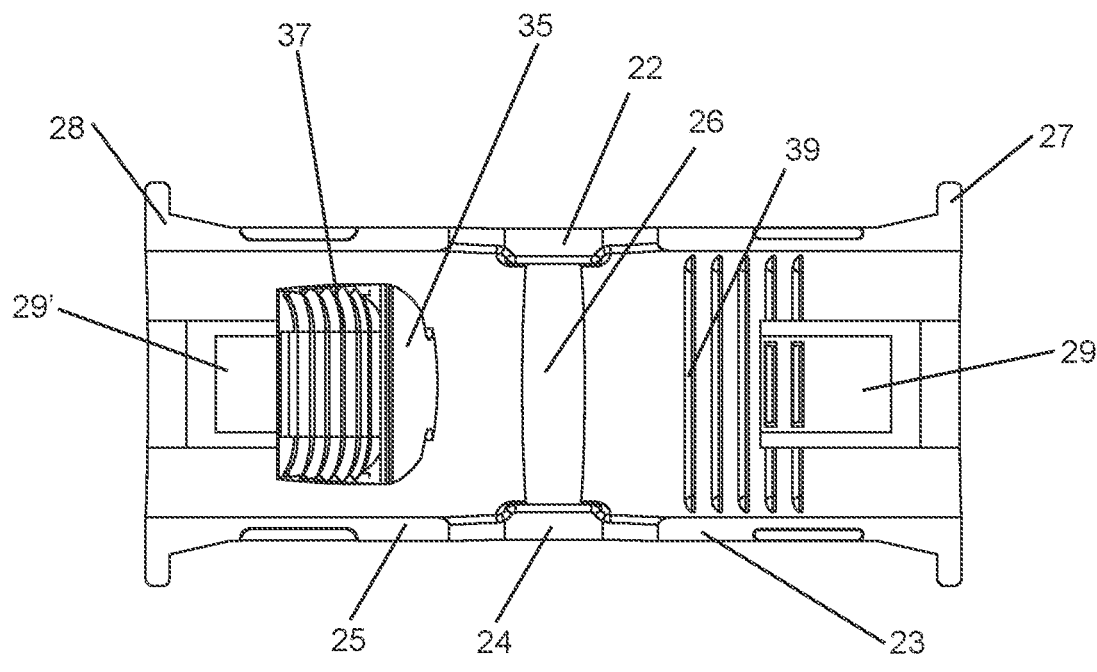
FIG. 1 is a bottom view of an embodiment of the present invention in an unfolded state.
Figure 2:
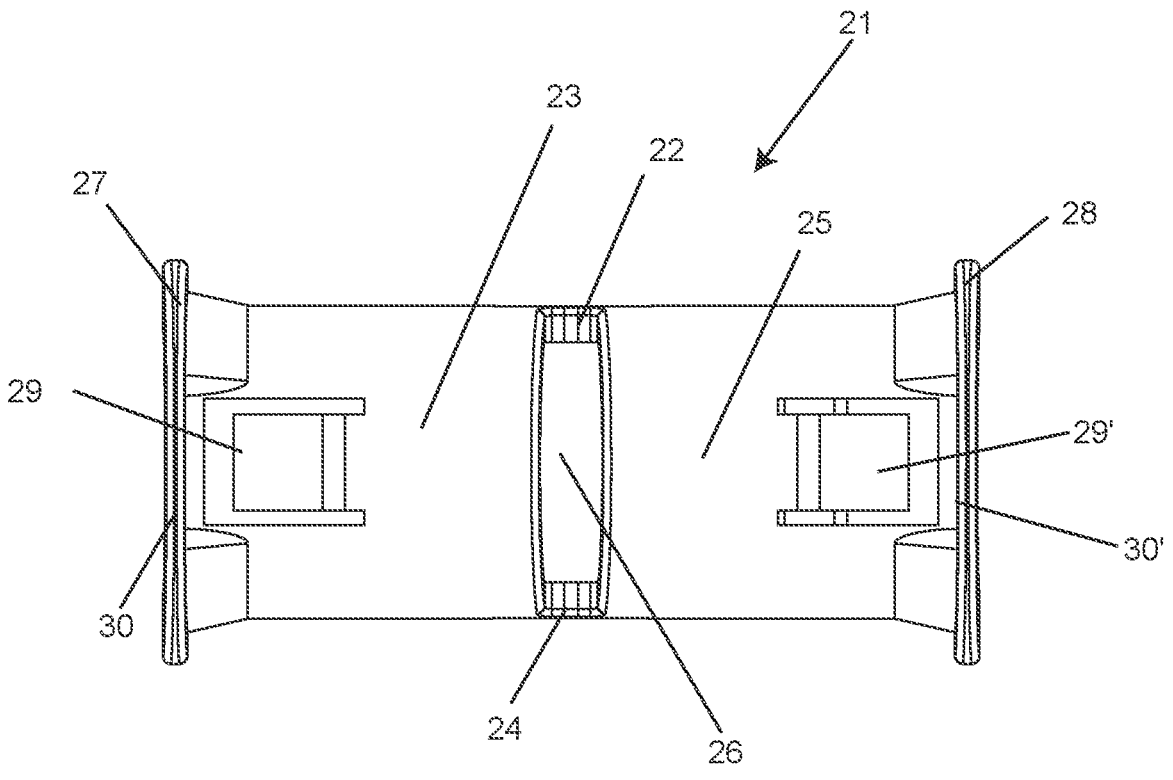
FIG. 2 is a top view of an embodiment of the present invention in an unfolded state.

Referring to the drawings wherein like reference characters designate like or corresponding parts throughout the several views, and referring particularly to the exemplary unfolded embodiment of FIGS. 1-7, it is seen that in this illustrated embodiment, a semi-cylindrical unit 21 is provided having a generally concave interior and a generally convex exterior, with a first semi-cylindrical half 23 and a second semi-cylindrical half 25, the two halves being separated by a central opening 26. The two halves 23, 25 are connected together at opposite ends of opening 26 by hinge members 22 and 24. In the exemplary illustrated embodiment, it is seen that unit 21 has a first semi-circular flange 27 at one end, and a second semi-circular flange 28 at the opposite end. A plurality of tapered longitudinal tabs 29, 29' are provided along the outside surfaces of the two halves extending radially outward therefrom, defining gaps 30, 30' between these flanges 29, 29', respectively, and semi-circular flanges 27, 28. Longitudinal tabs 29, 29' may be tapered downward toward the central opening and may be depressed to facilitate insertion into a knockout hole as described below.

Hinge members 22, 24 may be provided in the form of deformable material as shown in the illustrated embodiment allowing the two halves 23, 25 to be folded against each other to form a cylinder, as illustrated in FIGS. 8-11. In alternative embodiments, the hinge members connecting halves 23, 25 may be separately attached at opposite ends of the central opening 26.

Figure 6:
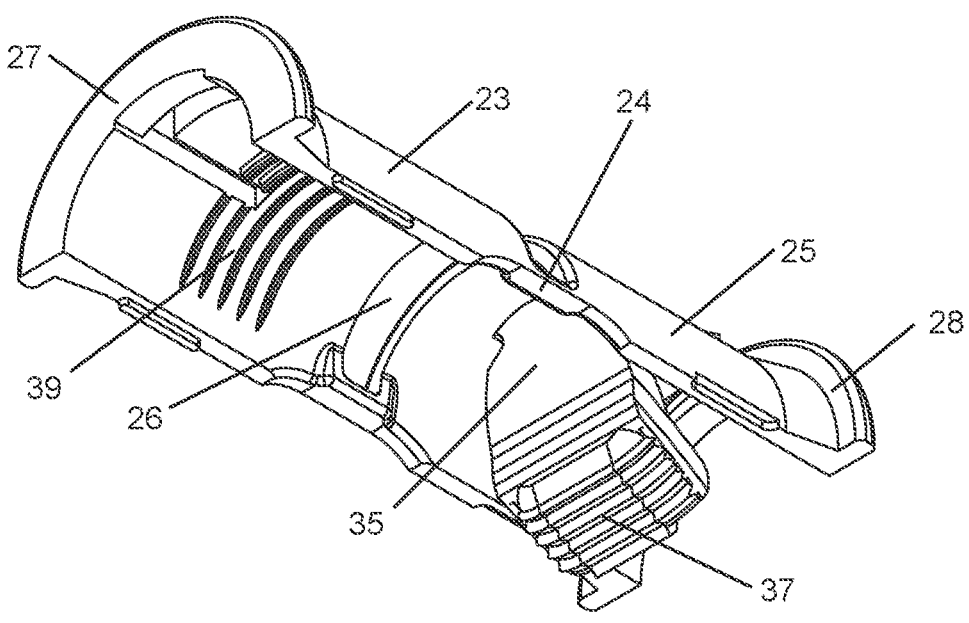
FIG. 6 is a bottom perspective view of an embodiment of the present invention in an unfolded state.
Figure 7:
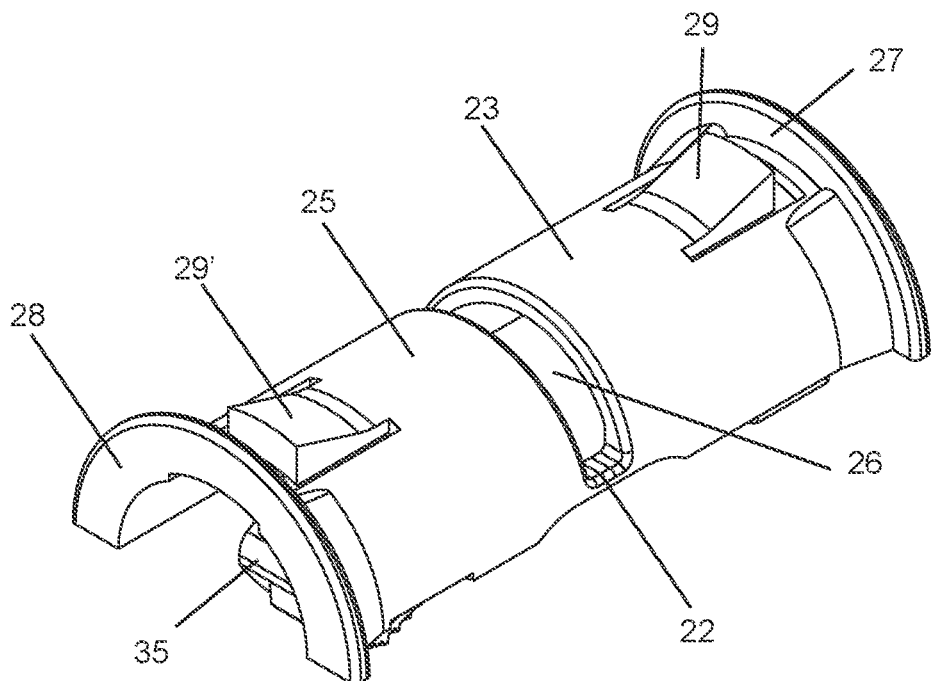
FIG. 7 is a top perspective view of an embodiment of the present invention in an unfolded state.
Figure 8:
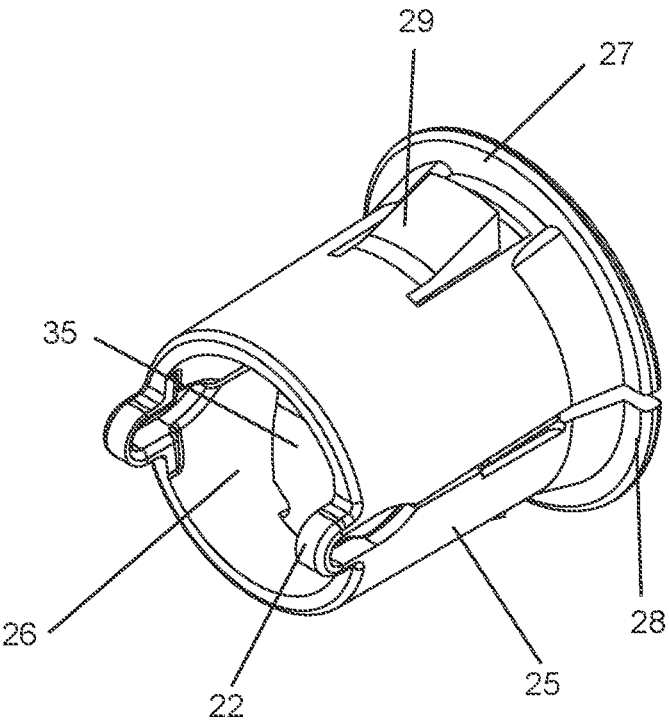
FIG. 8 is a side perspective view of an embodiment of the present invention in a folded state.
Figure 9:
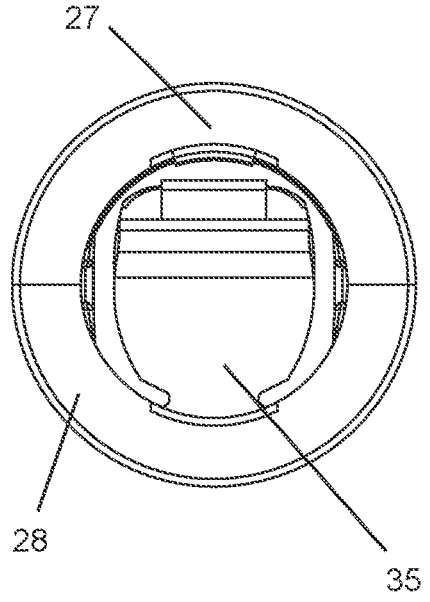
FIG. 9 is an end view of an embodiment of the present invention in a folded state.
Figure 10:
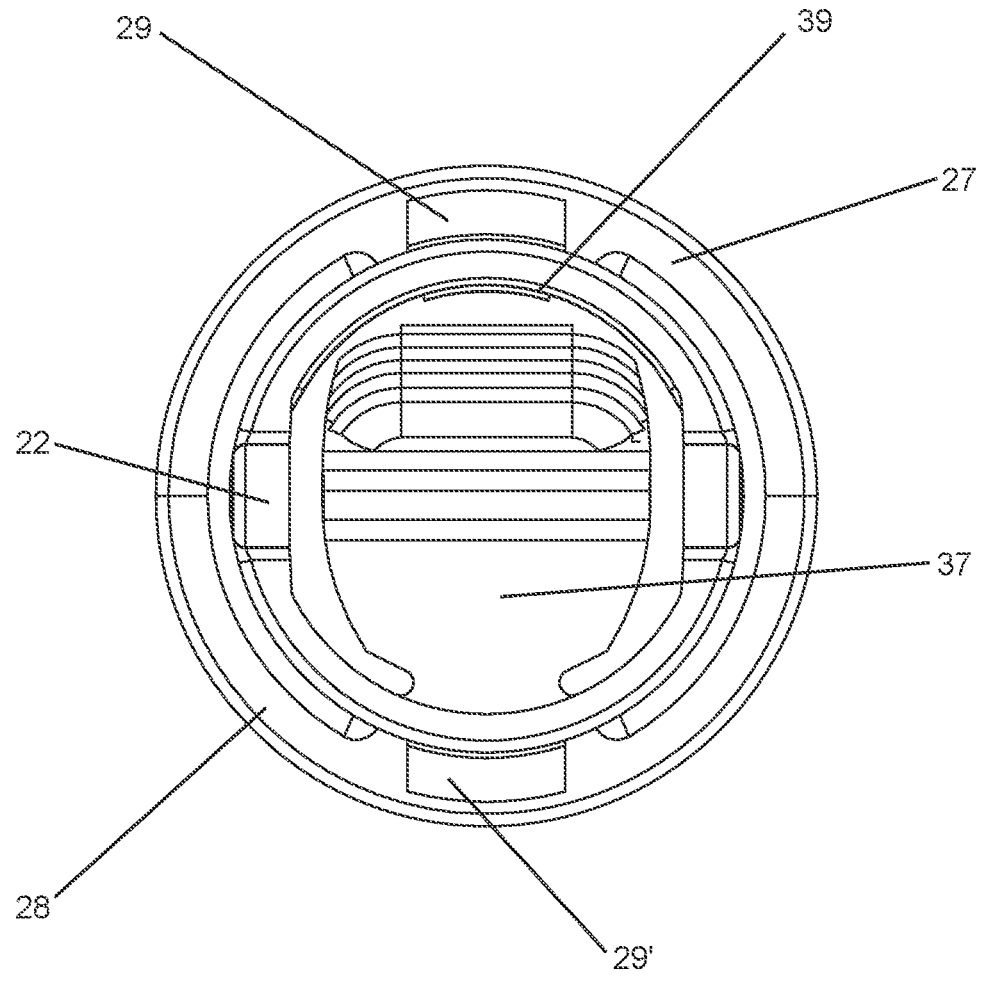
FIG. 10 is an opposite end view of an embodiment of the present invention in a folded state.

Referring to the inside perspective view of the illustrated embodiment shown in FIG. 6, it is seen that in this exemplary embodiment a gripping finger 35 is provided on the inside of cylindrical half 25. This finger 35 protrudes out and away from the internal concave surface of half 25 as shown in the side view of FIG. 3, and the end views of FIGS. 4 and 5. The proximal end of finger 35 is hingedly and/or flexibly attached to the interior concave surface of half 25. The distal end of finger 35 is provided with a frictional surface 37 that is used to engage and grip one or more wires 49 extending through the unit. In the illustrated embodiment of FIG. 6, the distal frictional surface 37 of finger 35 is provided in the form of a plurality of parallel ridges. It is to be appreciated that other frictional surfaces may be employed including without limitation, rough texture, teeth, and the like, and combinations thereof. In the illustrated embodiment, the ridges 37 engage one or more wires 49 as shown in the sectional view of FIG. 11. It is to be appreciated that finger 35 should preferably be angled toward the open end of the half where it is provided in order to securely engage and hold one or more wires, although other angles may also be used in conjunction with appropriate complementary frictional surfaces on the opposite half. In the illustrated embodiment, semi-circular flange 27 is provided at the open end of the other half 23, and finger 35 is angled in this direction.

Figure 11:
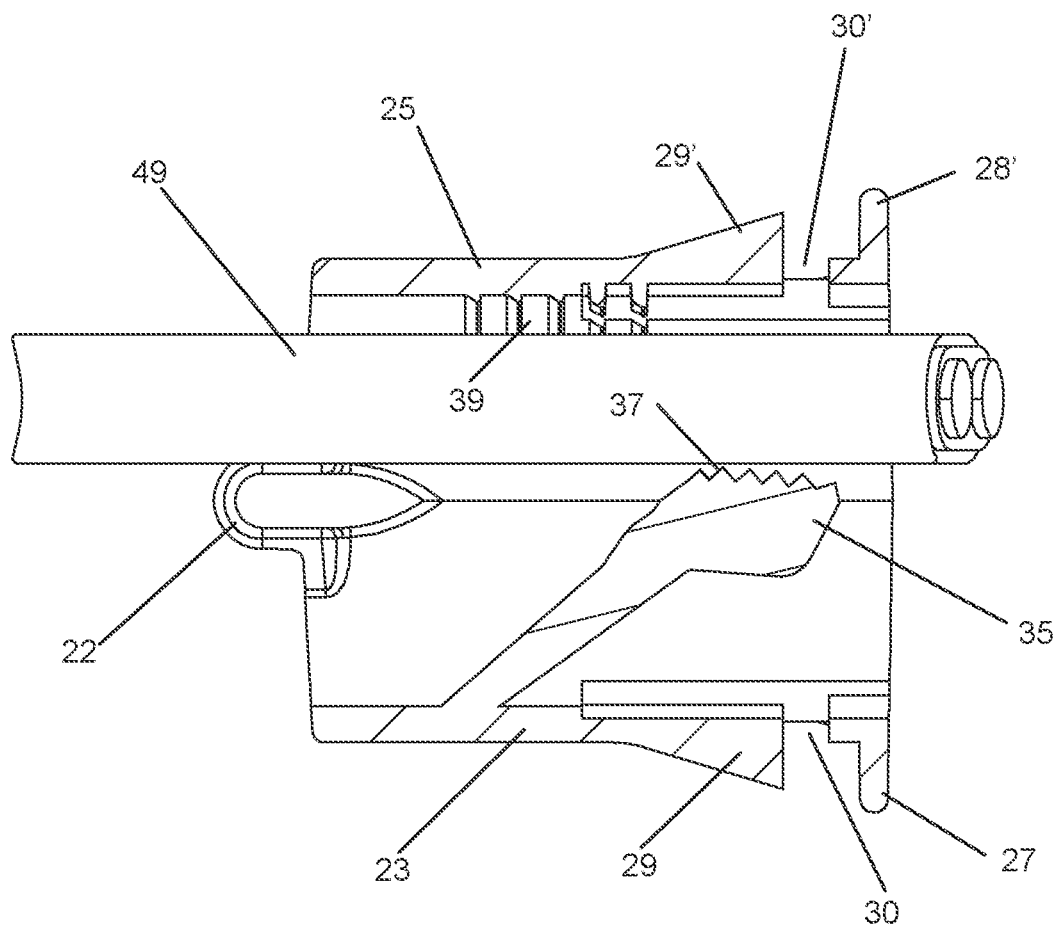
FIG. 11 is a sectional side view of an embodiment of the present invention in a folded state holding a wire.

In the exemplary embodiment illustrated in FIG. 6, it is seen that one or more complementary frictional surfaces 39 are provided on the inside concave surface of the other semi-circular half 23. The frictional surfaces 39 on the other half 23 may be the same as or different from those found at the distal end of finger 35. It is to be appreciated that these frictional surfaces 39 may be provided directly across from the frictional surface 37 of finger 35 (when the two halves 23, 25 are closed), or they may be offset therefrom, as illustrated in FIG. 11. It is to be appreciated that multiple frictional surfaces 39 may be provided on the inside surface of the other half 23, and that these surfaces may be the same or they may be different from each other (e.g., ridges, teeth, rough texture, etc., and combinations thereof).

In other embodiments (not shown) multiple fingers may be provided. For example, and without limitation, one finger may be provided in each of halves 23 and 25. When two fingers are provided, they may each be angled away from the central opening of the unit and toward the closest outside edge. In embodiments having a finger in each half, the fingers may meet each other when the halves are closed, or the fingers may be offset such that they each engage a frictional surface on the opposite half when closed.

In further embodiments (not shown), no fingers are provided; instead, a plurality of outwardly protruding members such as, without limitation, ridges or teeth may be provided on the inside surfaces of one or both halves 23, 25. These protruding members may be provided with frictional surfaces thereon. The protruding members may be the same inside both halves 23, 25 (e.g. teeth may be provided inside first half 23 and teeth may be provided inside second half 25), or they may be different (e.g., teeth may be provided inside first half 23, and ridges inside second half 25). In some embodiments, the protruding members may meet each other when the two halves are closed. The protruding members may be slightly deformable. In other embodiments, the protruding members may not meet, leaving a gap for wires 49. The heights of the protruding members may be varied to create different sized gaps therebetween when the halves are closed. In other embodiments, a plurality of protruding members or fingers may be provided in one or both halves 23, 25. The protruding members may be across from or offset from each other, and may interleave when the two halves are closed. In some embodiments one or more large protruding members may be provided on only one of the halves.

Figure 12:
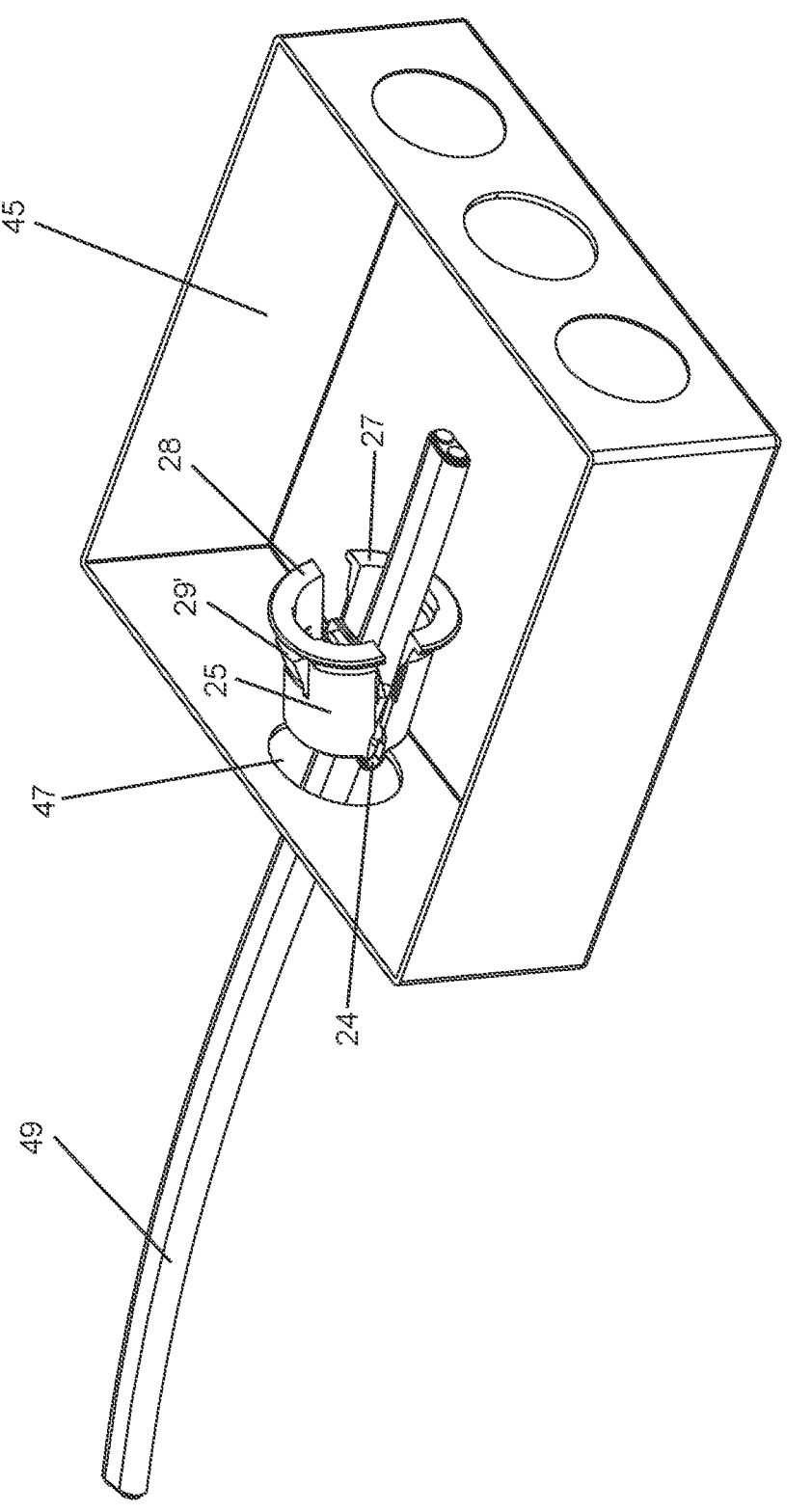
FIG. 12 is a perspective environmental view of an embodiment of the present invention in an electrical box in which two halves have been partially closed over a wire.
Figure 13:
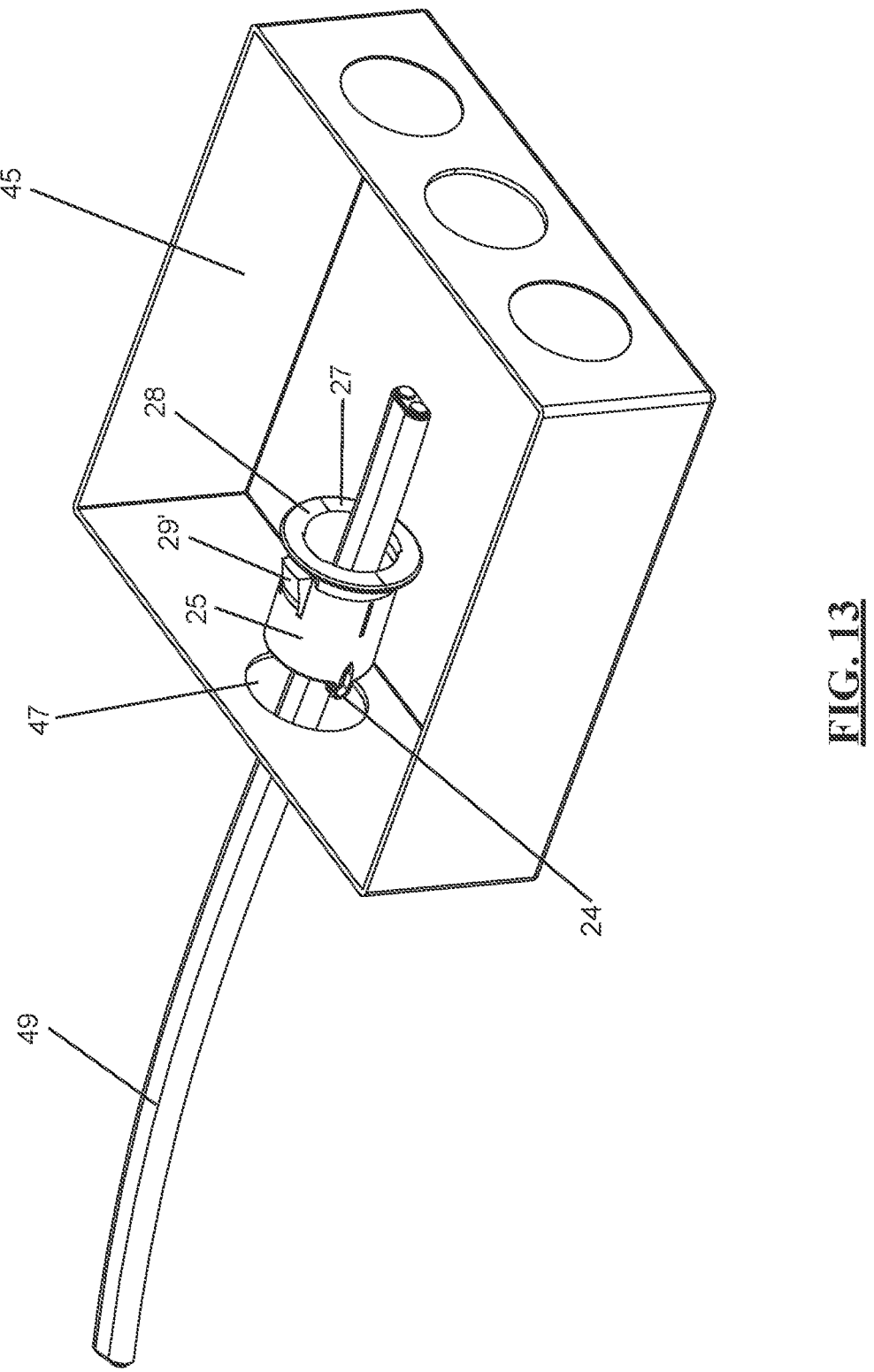
FIG. 13 is a perspective environmental view of an embodiment of the present invention in an electrical box in which two halves of the invention have been fully closed over a wire.
Figure 14:
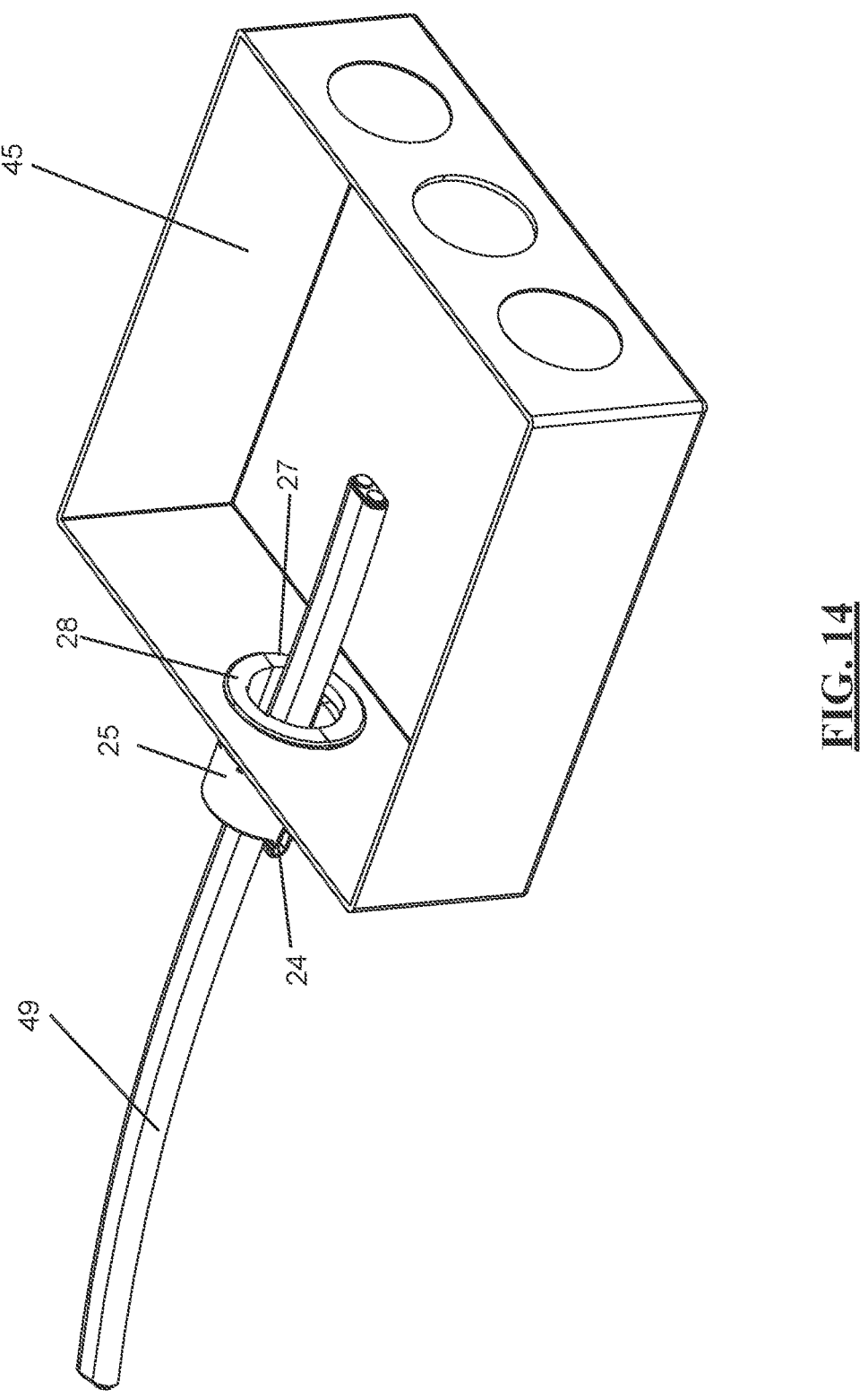
FIG. 14 is a perspective environmental view of an embodiment of the present invention in an electrical box in which two halves of the invention have been fully closed over a wire, and the invention has been inserted into a knockout hole of the electrical box.

Installation of an exemplary unit of the present invention into a knockout hole of an electrical box 45 is illustrated in FIGS. 12-14. It is to be appreciated that similar steps may be followed to insert a unit into an electrical panel. In this illustrated embodiment, a single wire 49 is run to an electrical box 45 through knockout hole 47. The wire 49 is first passed from the outside of an electrical box to the inside of the box through a knockout hole, and then threaded through the central opening 26 of an unfolded unit 21, as shown in FIG. 12. It is seen that the wire 49 is threaded into the central opening 26 such that the outside (convex side) of the unfolded unit 21 faces and is closest to the knockout hole 47. Although a single wire 49 is illustrated, it is to be appreciated that multiple wires 49 may be inserted in the same way. The unit 21 is placed on the wire(s) 49 at a position that provides a desired amount of slack on the inside of the electrical box 45.

The semi-circular halves 23, 25 of the illustrated exemplary unit are then folded together to form a cylinder around the wire(s) as shown in FIG. 13. This causes the gripping member(s) such as frictional surface(s) 37, 39 or finger(s) 35 inside the unit to firmly grip the wire(s) extending therethrough. The closed unit, now firmly secured to the wire(s), is then pushed through the knockout hole 47 from which the wire(s) enter the unit, causing the longitudinal tabs 29 to pop through the hole, thereby holding the unit against the outside of the box. The two semi-circular halves 27, 28 form a circular flange that is flush against an inside surface of the box 45 around the knockout hole 47, as shown in FIG. 14.

It is to be appreciated that the engagement of the longitudinal tabs 29 and the circular flange 27, 28 with the knockout hole 47 in the electrical box 45 keeps the two halves 23, 25 of the unit securely engaged with each other and with the electrical box 45, thereby securely holding the wire(s) 49 contained therein. It is also to be appreciated that the entire installation a unit 21 of the present invention, including removal of a pre-existing clamp and replacement with a unit of the present invention, may be accomplished from inside the electrical box 45, avoiding the need to access the exterior of the box 45 which could result in damage to surrounding existing walls.

In an alternative method, the unit 21 may first be slotted into the knockout hole 47 from the inside of the box 45, after which the wires or cables 49 are run through the installed unit 21.

In some embodiments of the present invention, as illustrated in FIGS. 15-23, the foldable unit 121 may be specialized for clamping and grounding at least one electrical wire housed in an armored feeder cable (AFC) or other similar conduit for electrical boxes and panels in commercial applications.

Figure 15:
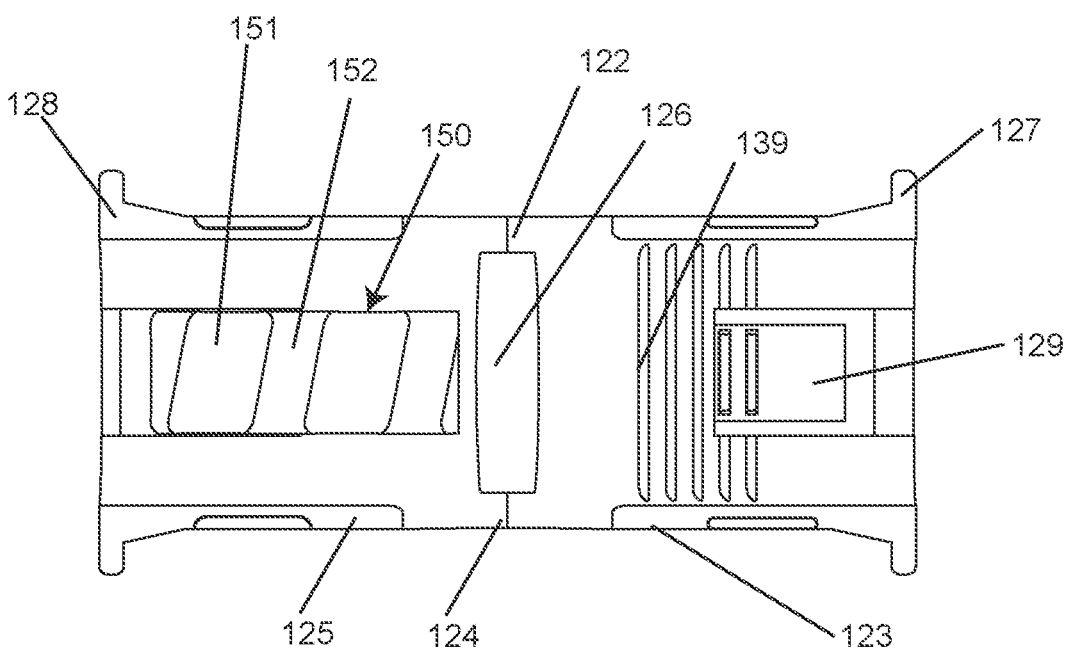
FIG. 15 is a bottom view of an alternative embodiment of the present invention in an unfolded state.
Figure 16:
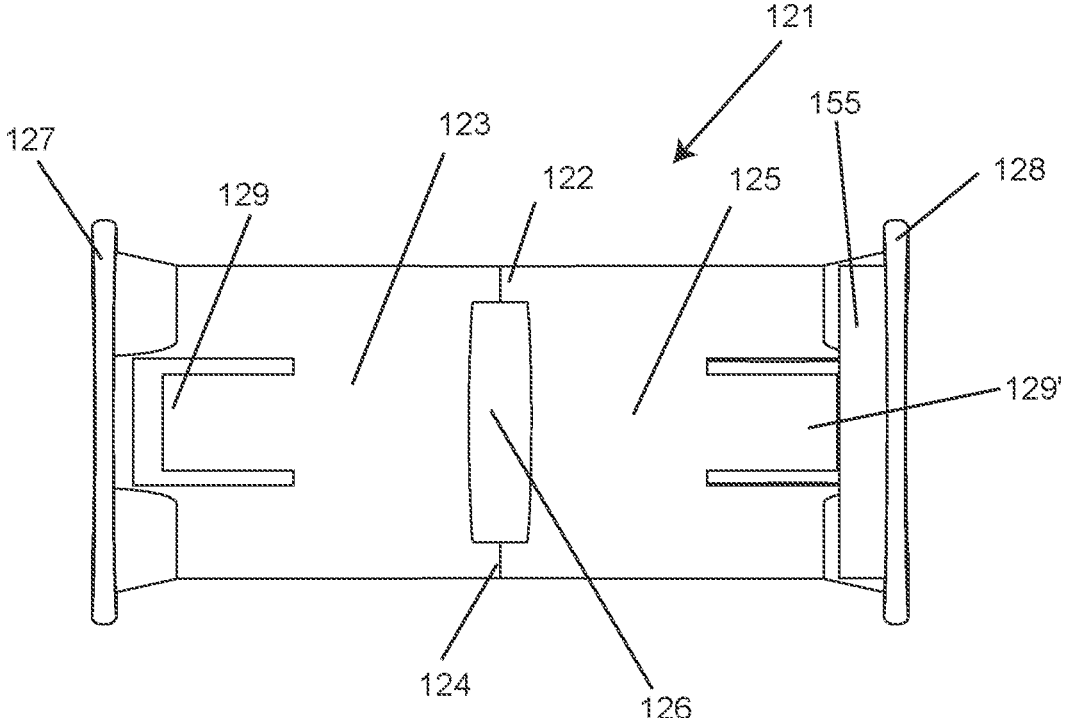
FIG. 16 is a top view of the embodiment of FIG. 15 in an unfolded state.

It is seen in FIG. 15 that unit 121 may have a generally concave interior and a generally convex exterior, with a first semi-cylindrical half 123 and a second semi-cylindrical half 125, the two halves being separated by a central opening 126. The two halves 123, 125 may be connected together at opposite ends of opening 126 by hinge members 122 and 124. In the exemplary illustrated embodiment, it is seen that unit 121 has a first flange 127 at one end, and a second flange 128 at the opposite end. A plurality of tapered longitudinal tabs 129, 129' are provided along the outside surfaces of the two halves extending radially outward therefrom, defining a gap 130, 130' between these flanges 129, 129' and semi-circular flanges 127, 128. Longitudinal tabs 129, 129' may be tapered downward toward the central opening and may be depressed to facilitate insertion into a knockout hole as described below.

Figure 22:
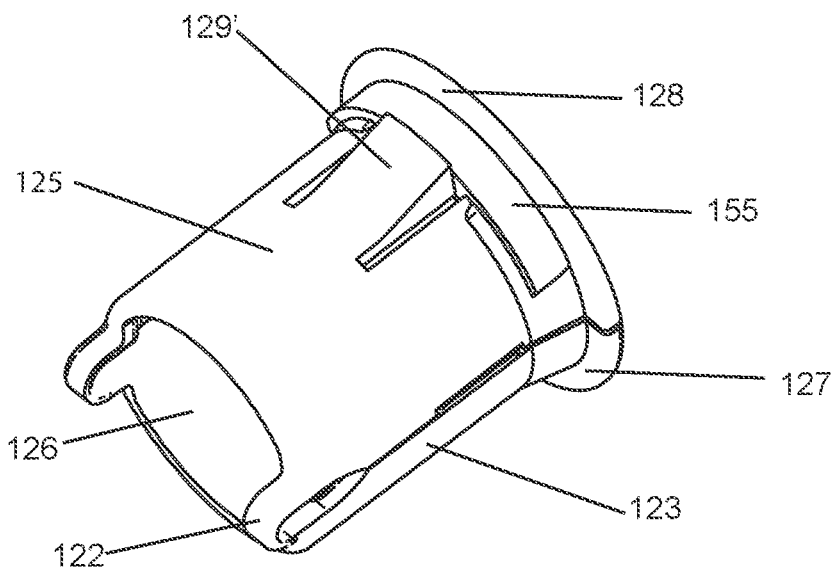
FIG. 22 is a side perspective view of an alternative embodiment of the present invention in a folded state.
Figure 23:
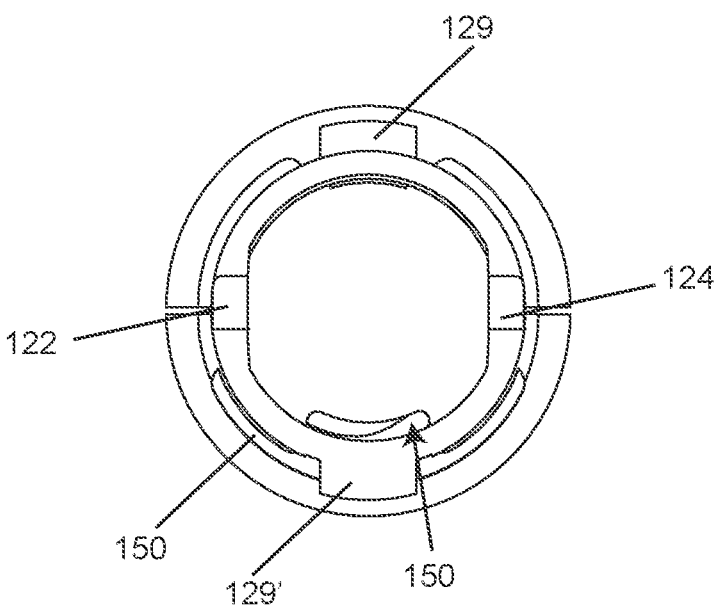
FIG. 23 is an end view of an alternative embodiment of the present invention in a folded state.

Hinge members 122, 124 may be provided in the form of deformable material as shown in the illustrated embodiment allowing the two halves 123, 125 to be folded against each other to form a cylinder, as illustrated in FIGS. 22-23. In alternative embodiments, the hinge members connecting halves 123, 125 may be separately attached at opposite ends of the central opening 126.

Figures 20, 21:
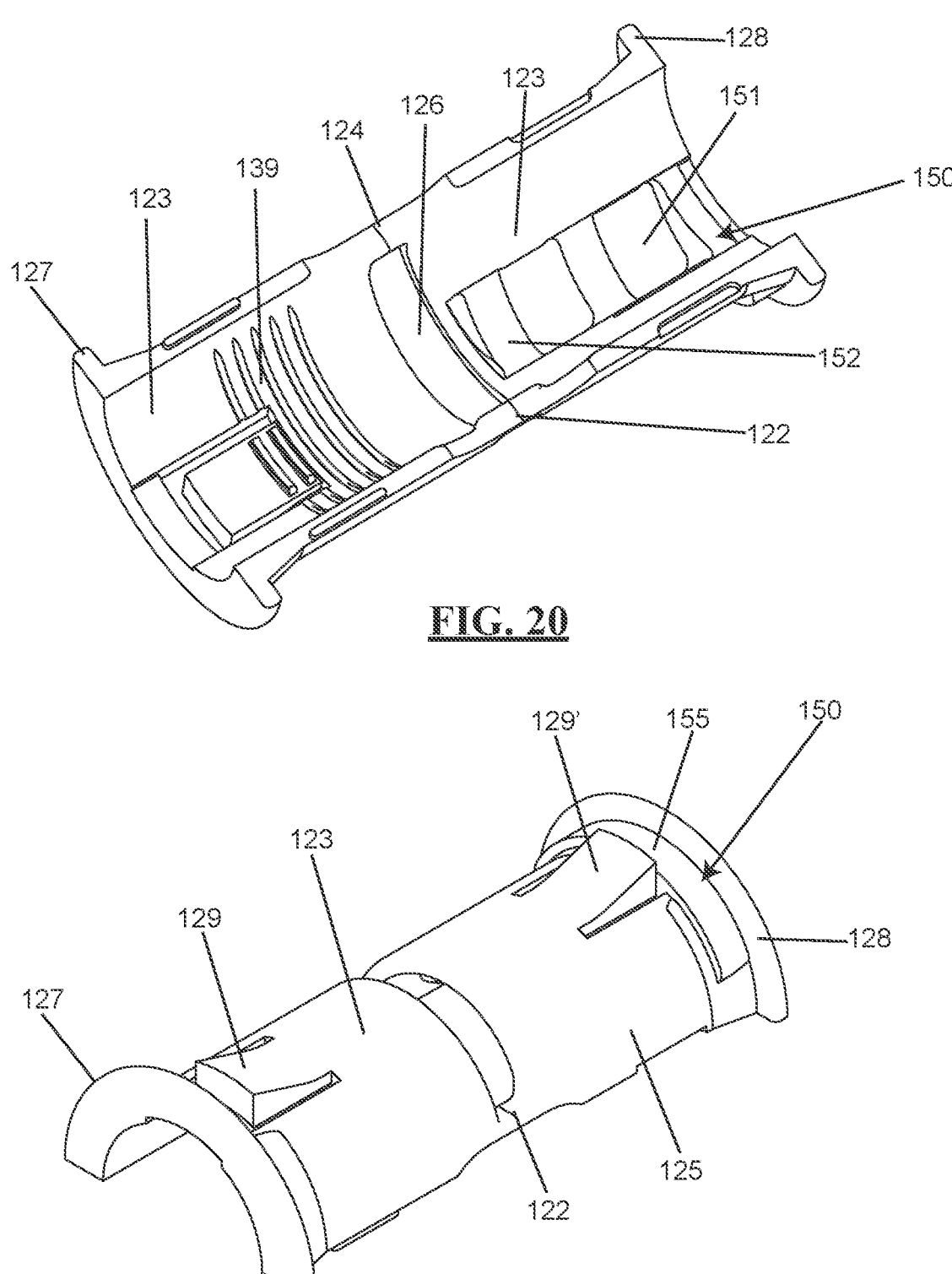
FIG. 20 is a bottom perspective view of an alternative embodiment of the present invention in an unfolded state.
FIG. 21 is a top perspective view of an alternative embodiment of the present invention in an unfolded state.
Figure 24:
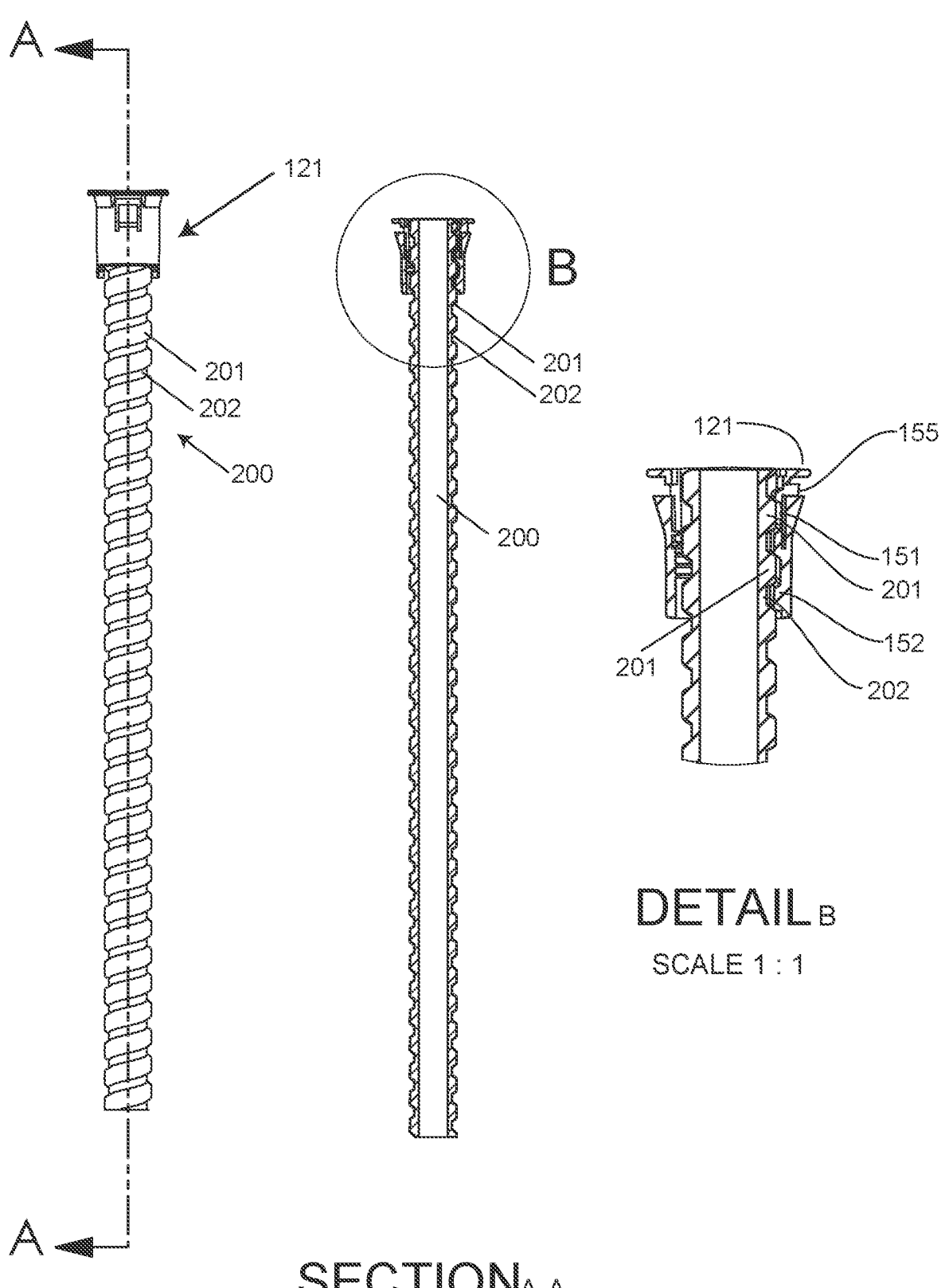
FIG. 24 is a side view of an embodiment of the present invention in a folded state engaged with a flexible conduit, a cross-section view thereof along the line A-A, and detailed cross-sectional view thereof at B.
Figure 24A:
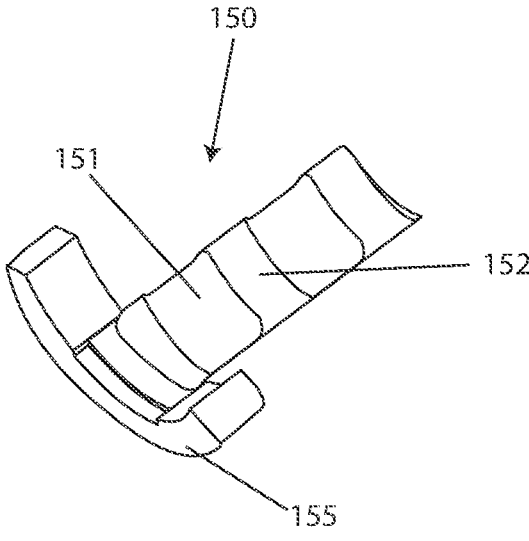
FIG. 24A is a perspective view of a grounding member of an embodiment of the present invention.
Figure 24B:
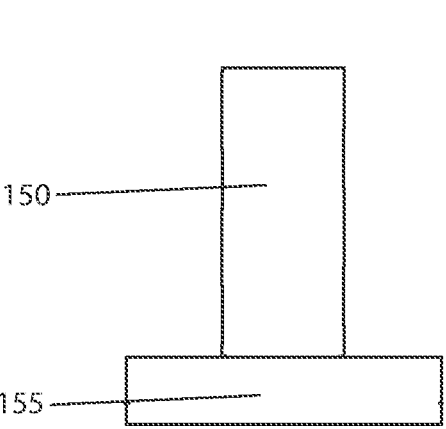
FIG. 24B is a back view of the grounding member of FIG. 24A.
Figure 24C:
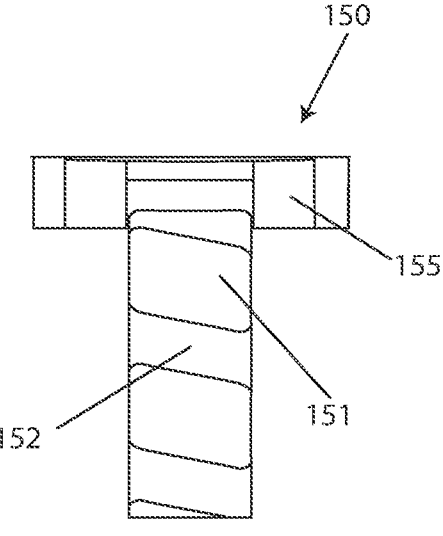
FIG. 24C is a front side view of the grounding member of FIG. 24A.
Figure 24D:
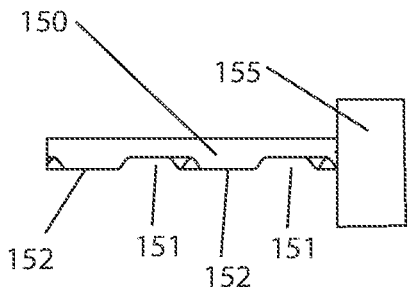
FIG. 24D is side view of the grounding member of FIG. 24A.
Figure 24E:
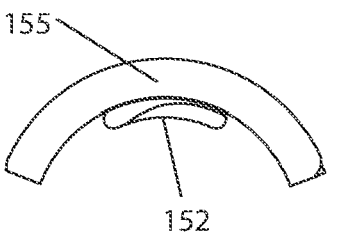
FIG. 24E is an end view of the grounding member of FIG. 24A.

Referring to the inside perspective view of the illustrated embodiment shown in FIG. 20, it is seen that in this exemplary embodiment a conductive metallic (grounding) member is provided having a first portion 150 on the inside of cylindrical half 123, and a second portion 155 on the exterior of cylindrical half 123. A groove may be provided in cylindrical half 123 to receive the first portion 150 of the grounding member. The grounding member may be constructed from a metallic material that is operable to provide an electrical ground that may be secured against a flexible metal conduit or AFC 200 as shown in FIG. 24. The internal portion of the grounding member 150 may have a smooth or concave interior surface as shown in FIGS. 28-31, or it may include an interior surface with a plurality of grooves 151 and peaks 152 as shown in FIGS. 20 and 24A-24E. The interior portion of grounding member 150 may be part of, attached to, coupled with, or otherwise in electric communication with an exterior metallic portion or clip 155 that is located on the exterior surface of half 123, adjacent to flange 128. An opening may be provided in half 123 for this coupling or communication. In other embodiments, the first portion of the grounding member 150 may itself extend through an opening in half 123 to the exterior surface thereof. The peaks 152 and grooves 151 on grounding member 150 may have a configuration that is complementary to the peaks and grooves of the AFC or conduit 200.

As shown in FIG. 17 the exterior metallic member or clip 155 may be positioned adjacent to flange 128, and may fit into gap 130 so that it may make contact with the metal electrical box 45 or a panel in order to ground the grounding member 150 between the conduit 200 and the box 45 or the panel. It is seen in FIGS. 18-19, 24E and 28-31 that the internal portion of the grounding member 150 may have a concaved interior surface and an exterior surface that is complementary to the interior surface of the cylindrical half 123. It is to be appreciated that in other embodiments, grounding member 150, 151 described above may be provided in the opposite cylindrical half 125, and that in other embodiments, two grounding members 150 may be provided, one in each of the cylindrical halves 123 and 125. As above, each such grounding member 150 is in electrical communication with an exterior metallic member or clip 155 to provide grounding between a metallic conduit 200 and a metallic box 45.

FIG. 24 illustrates an embodiment of a foldable unit 121 secured to an AFC or conduit 200. It is seen in the detail B that the peaks 152 are operable to nest into the grooves 202 of the connector and the grooves 151 are operable to receive the peak 201 of the conduit 200. It is to be appreciated that a plurality of peaks and grooves may be provided in the grounding member 150 and the profile of grooves may be uniform and may be slanted in the same orientation as a AFC conduit.

Detail of an embodiment of a grounding member is shown in FIGS. 24A-24E. These figures show the interior portion 150 of the grounding member attached to the exterior portion 155. Indentations or grooves 151, and protrusions or peaks 152 may be provided on the exposed surface of interior portion 150. In different embodiments, the sizes, shapes and positions of these peaks and grooves may be adjusted so as to be complementary to the peaks 201 and grooves 202 provided on differently sized and shaped conduits 200. For example and without limitation, the peaks 152 and grooves 151 of the interior portion 150 may have a sloping shape to match the helical grooves 202 and peaks 201 of a conduit 200.

Figure 25:
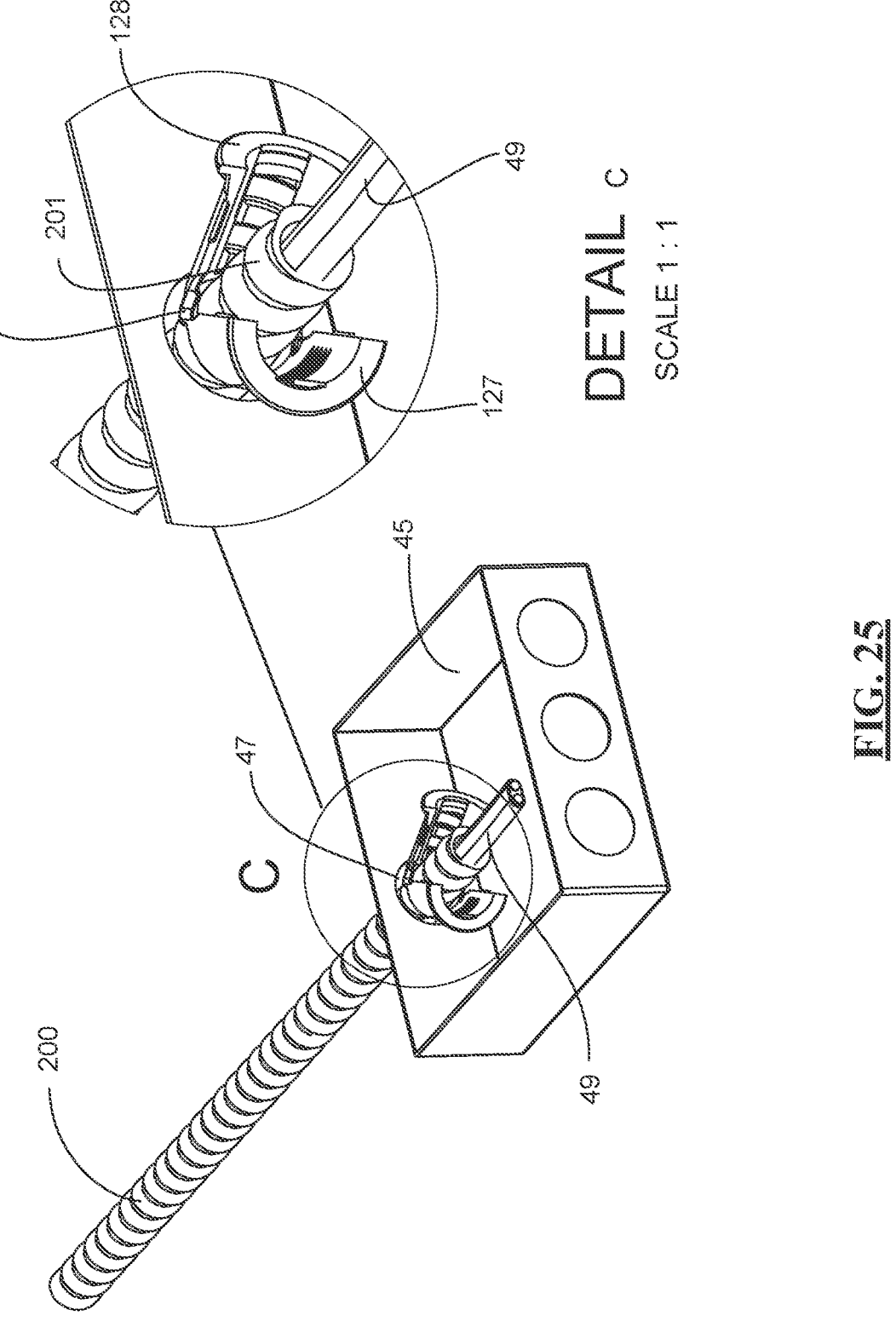
FIG. 25 is a perspective environmental view of an embodiment of the present invention in an electrical box in which two halves have been partially closed over a conduit, with detail at view C.
Figure 26:
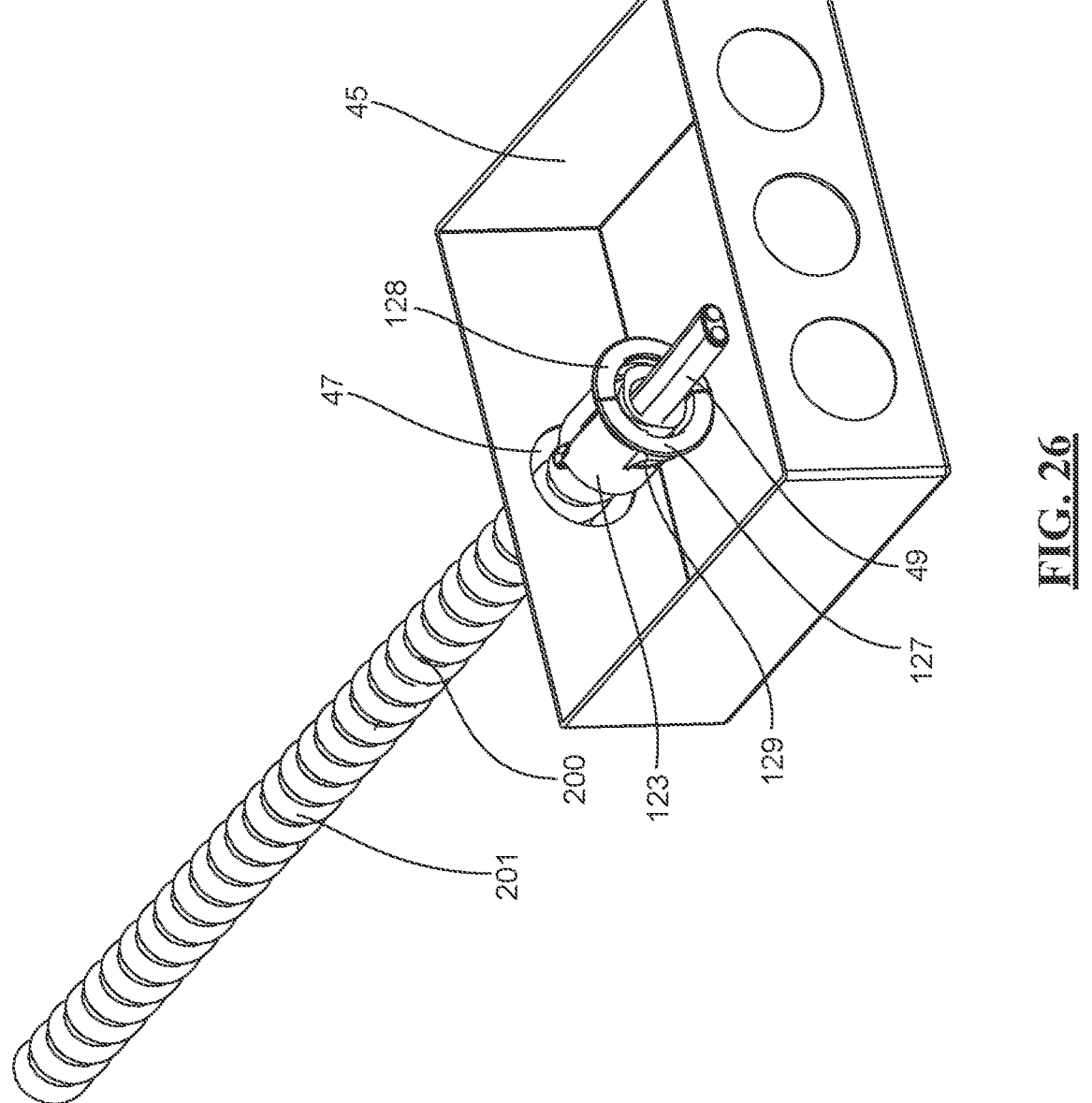
FIG. 26 is a perspective environmental view of an embodiment of the present invention in an electrical box in which two halves of the invention have been fully closed over a conduit.
Figure 27:
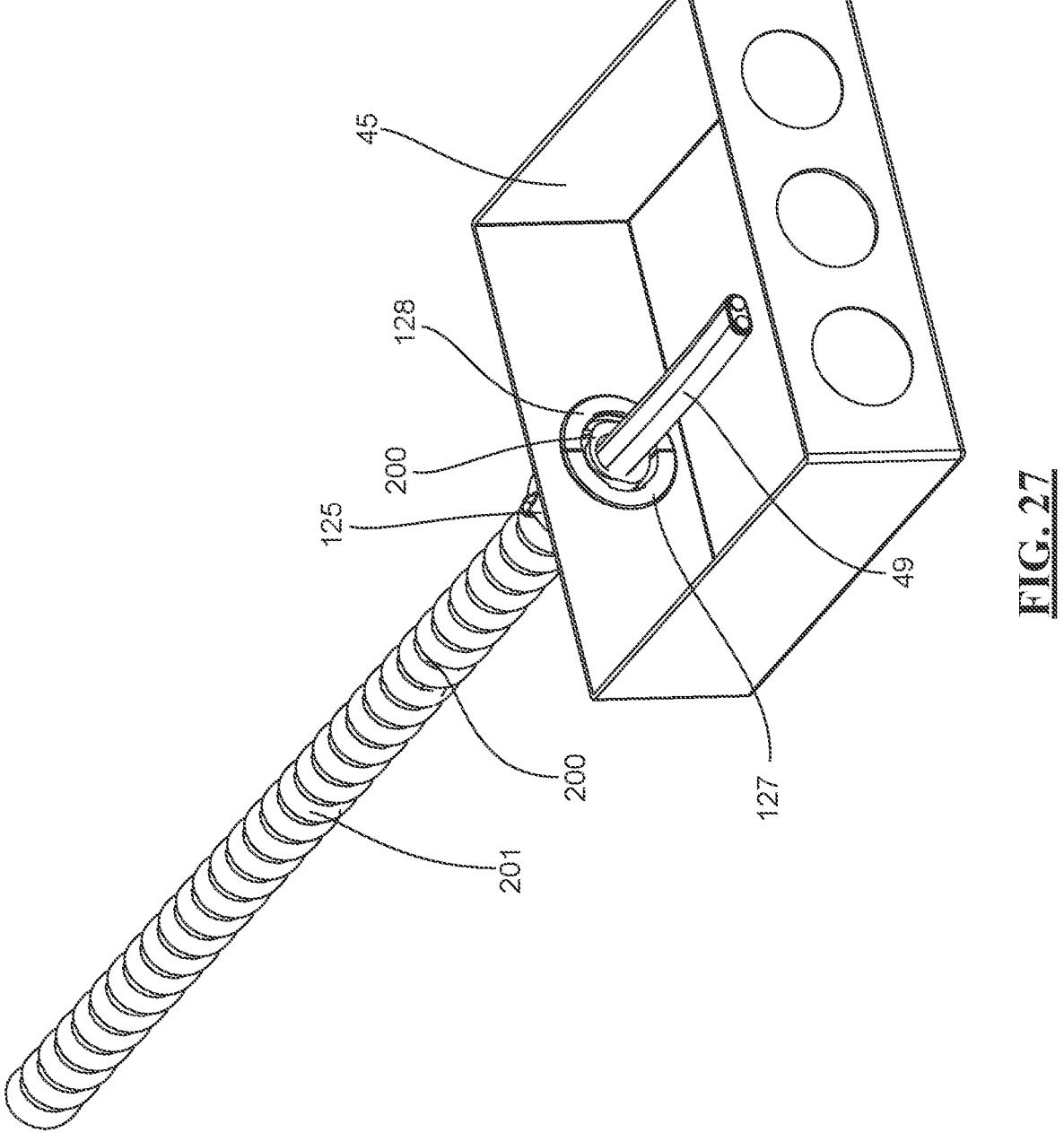
FIG. 27 is a perspective environmental view of an embodiment of the present invention in an electrical box in which two halves of the invention have been closed over a conduit, and the invention has been inserted into a knockout hole of the electrical box.

Installation of an exemplary grounding unit of the present invention into a knockout hole of an electrical box 45 is illustrated in FIGS. 25-26. It is to be appreciated that similar steps may be followed to insert a unit into an electrical panel. In this illustrated embodiment, it is seen that an electrical wire 49 is protected by a metallic conduit 200 and the conduit runs to an electrical box 45 through a knockout hole 47. The conduit 200 is first inserted from the outside of the electrical box through the knockout hole, and then inserted through the central opening 126 of the unfolded unit 121 as shown in FIG. 25. It is to be appreciated that, if present, the peaks and grooves of the interior grounding member 150 bay be aligned with the grooves and peaks of the conduit 200. In other embodiments interior member 150 may have a smooth surface which makes contact with only the peaks 201 of the conduit 200. The semi-circular halves 123, 125 of the illustrated exemplary unit are then folded together to form a cylinder around the AFC conduit as shown in FIG. 26. This causes the internal portion of the grounding member 150 to secure against the conduit 200 in a substantially fixed configuration, providing electrical communication between the conduit 200 and the grounding member. Although the conduit 200 illustrated in FIG. 25 houses a single pair of wires 49, it is to be appreciated that multiple wires 49 may be inserted in the conduit 200 in the same way. The closed unit, now firmly secured to the conduit housing, is then pushed through the knockout hole 47 from which the conduit enters the unit, causing the longitudinal tabs 29 to pop through the hole, thereby holding the unit against the outside of the box. The two flanges 128, 129 engage flush against an inside surface of the box 45 around the knockout hole 47, as shown in FIG. 27. This engagement also causes exterior metallic portion or clip 155 to make contact with box 45 around the knockout hole 47, thereby providing electric communication between the exterior portion 155 and box 45. Thus, the engagement of the two halves 123, 125 of the clamp around conduit 200, and the insertion of the clamp into the knockout hole 57 provides electrical communication between conduit 200, interior portion 150, exterior portion 155 and knockout hole 47, thereby providing an electrical ground between the box 45 and the conduit 200.

Figures 28, 29:
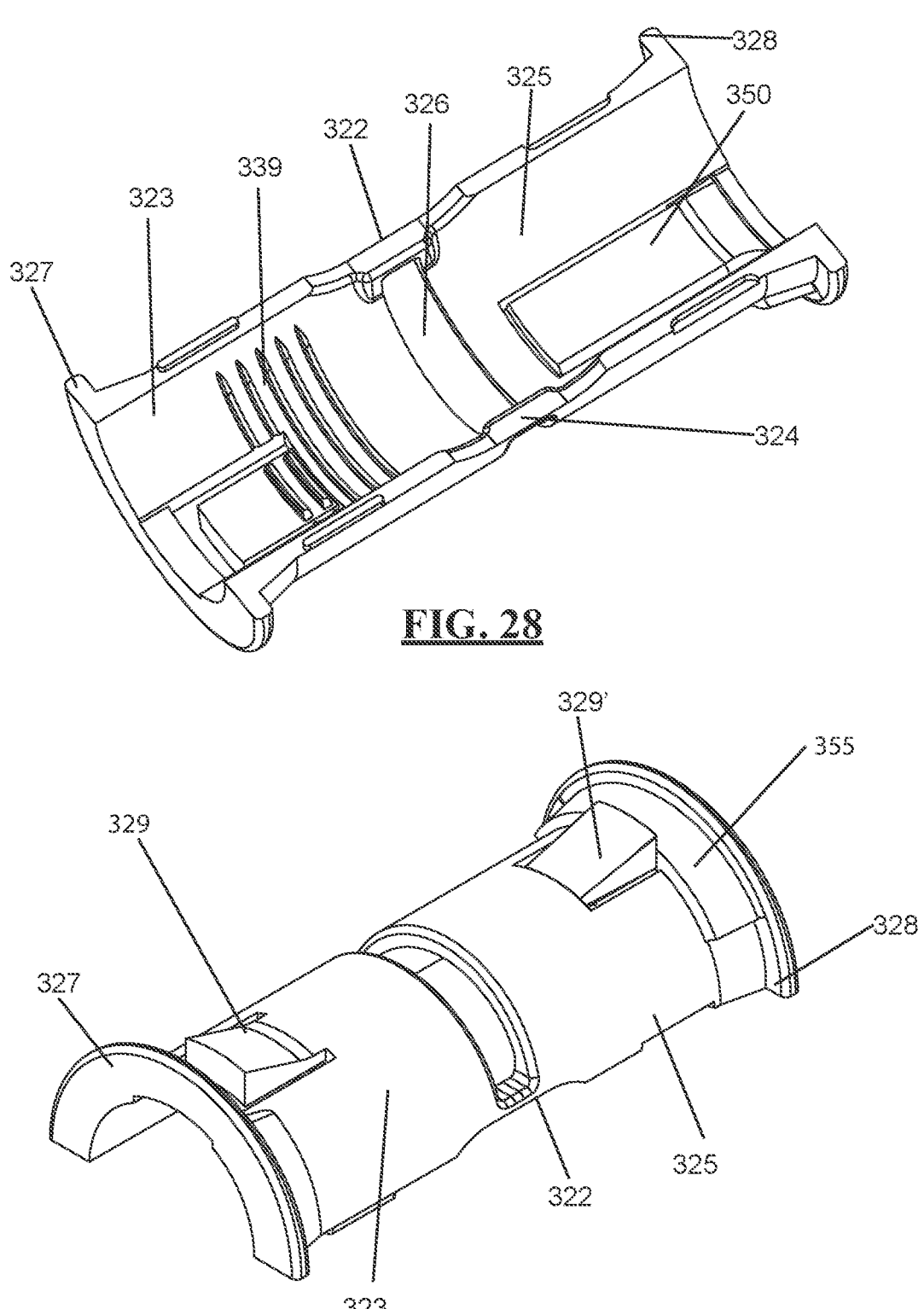
FIG. 28 is an interior perspective view of an alternative embodiment of the invention.
FIG. 29 is an exterior end perspective view of the embodiment of FIG. 28.
Figure 30:
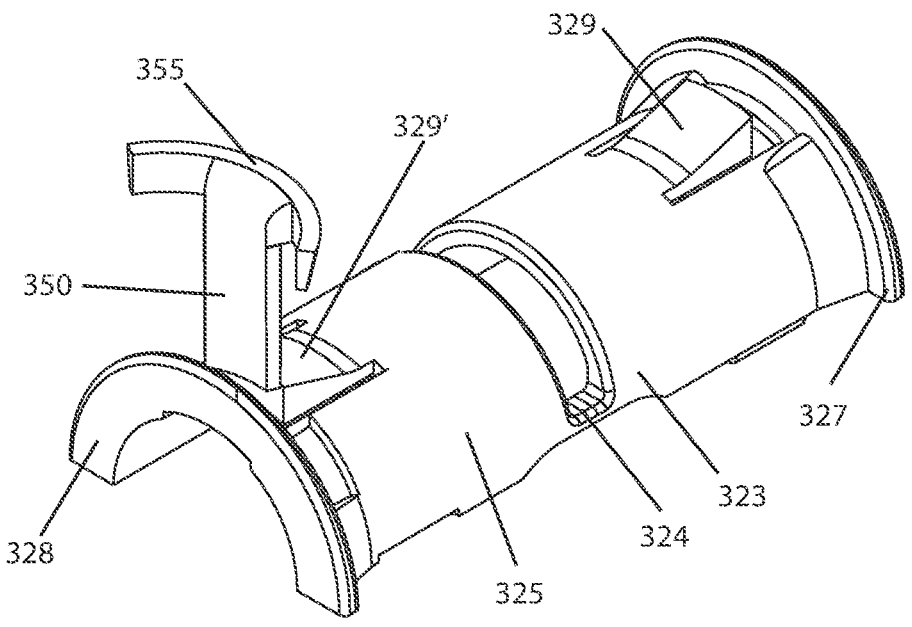
FIG. 30 is exterior opposite end perspective view of the embodiment of FIG. 28, showing a conductive member partially engaged.
Figure 31:
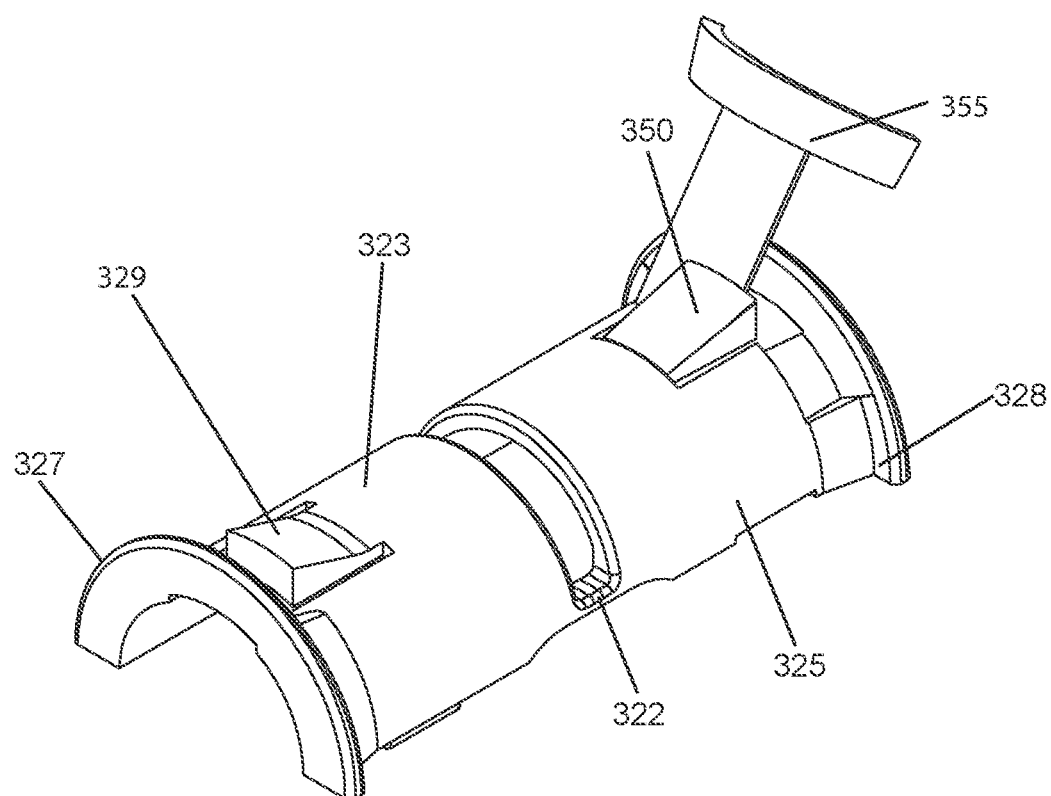
FIG. 31 is an exterior end perspective view of the embodiment of FIG. 28, showing a conductive member partially engaged.

The alternative embodiments illustrated in FIGS. 28-31 provide a grounding member having an interior portion 350 having a smooth exposed concave surface that is connected to or integral with an exterior portion 355. These embodiments may be used with smooth conduits 200, but may also be used with corrugated conduits with peaks and grooves. Similarly, the embodiments of FIGS. 24A-24E may be used with either smooth or corrugated conduits 200. It is seen in FIGS. 28-30 that unit 321 may have a generally concave interior and a generally convex exterior, with a first semi-cylindrical half 323 and a second semi-cylindrical half 325, the two halves being separated by a central opening 326. The two halves 323, 325 may be connected together at opposite ends of opening 326 by hinge members 322 and 324. In the exemplary illustrated embodiment, it is seen that unit 321 has a first flange 327 at one end, and a second flange 328 at the opposite end. At least one tapered longitudinal tab 329 is provided along the outside surface of one of the two halves (e.g., 323) extending radially outward therefrom, defining a gap 330 between the flange 329 and semi-circular flanges 327. Longitudinal tab 129 may be tapered downward toward the central opening and may be depressed to facilitate insertion into a knockout hole as described elsewhere herein. An opening 358 is provided on the other half (e.g., 325) through which the interior portion of the metallic grounding member 350 extends. The exterior portion 355 may fit flush into a groove along flange 328 for engagement against the edges of knockout hole 47 when the folded unit is inserted, thereby providing grounding between a conduit 200 clamped inside the unit 323, 325 and the electrical box 45.

Figure 32:
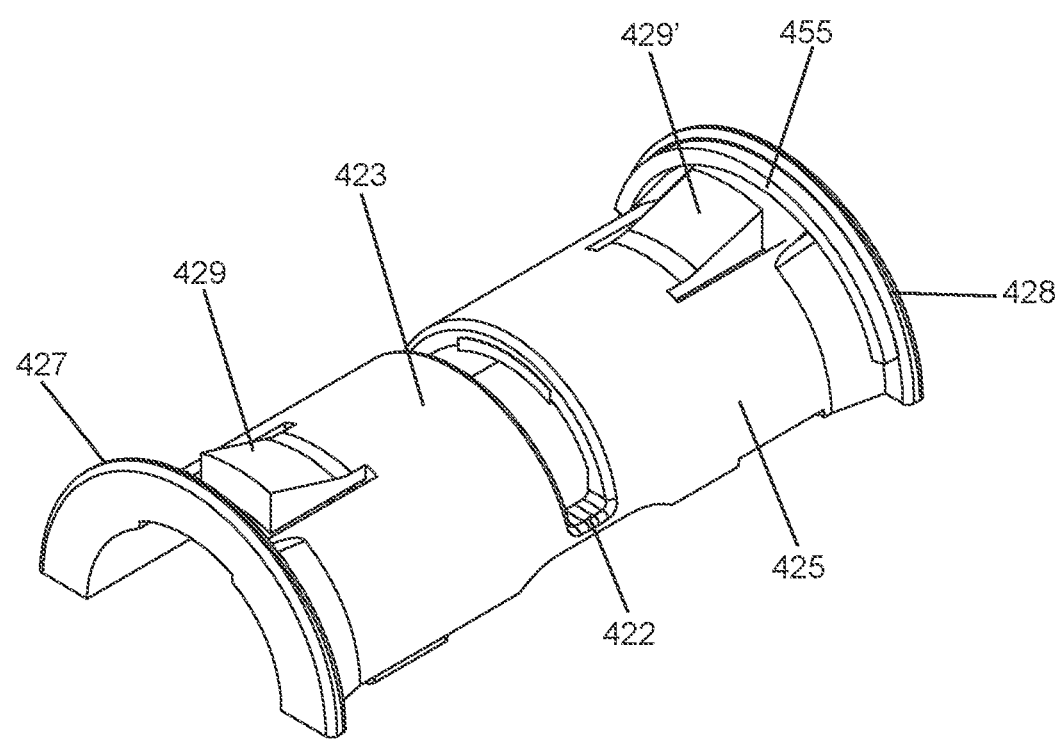
FIG. 32 is an exterior perspective view of an alternative embodiment of the invention.
Figure 33:
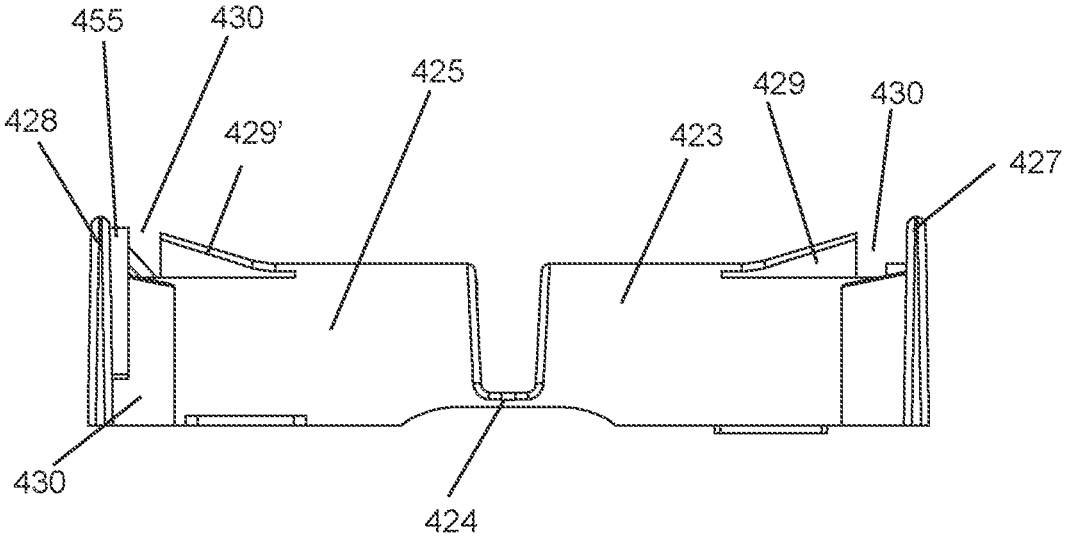
FIG. 33 is an exterior side view of the embodiment of FIG. 32.
Figure 34:
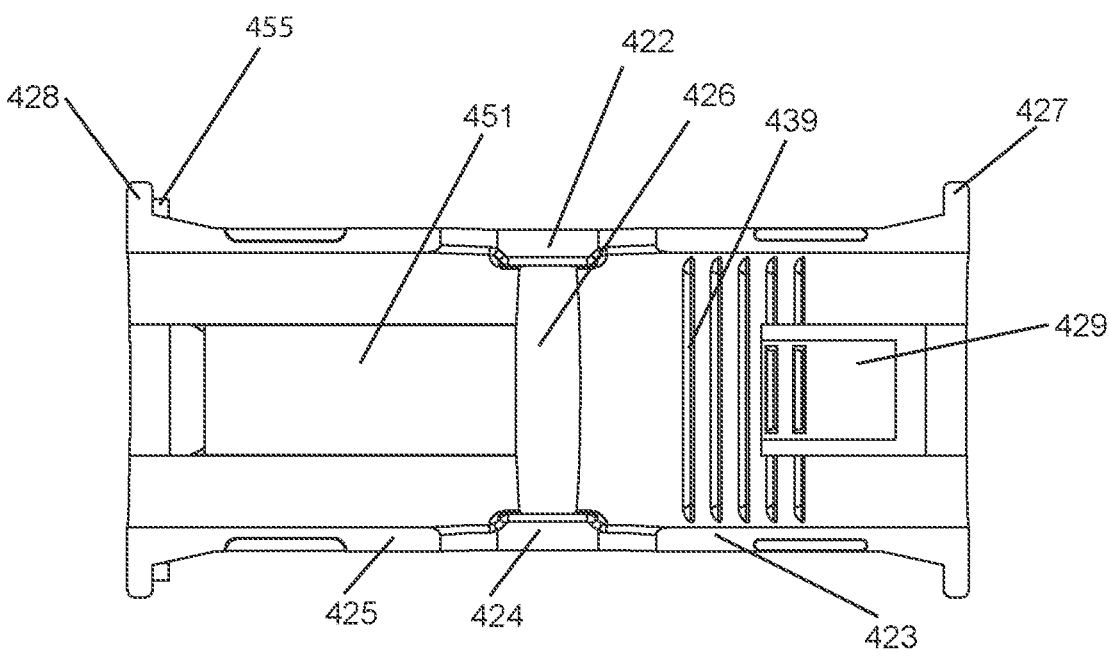
FIG. 34 is an interior bottom view of the embodiment of FIG. 32.
Figure 35:
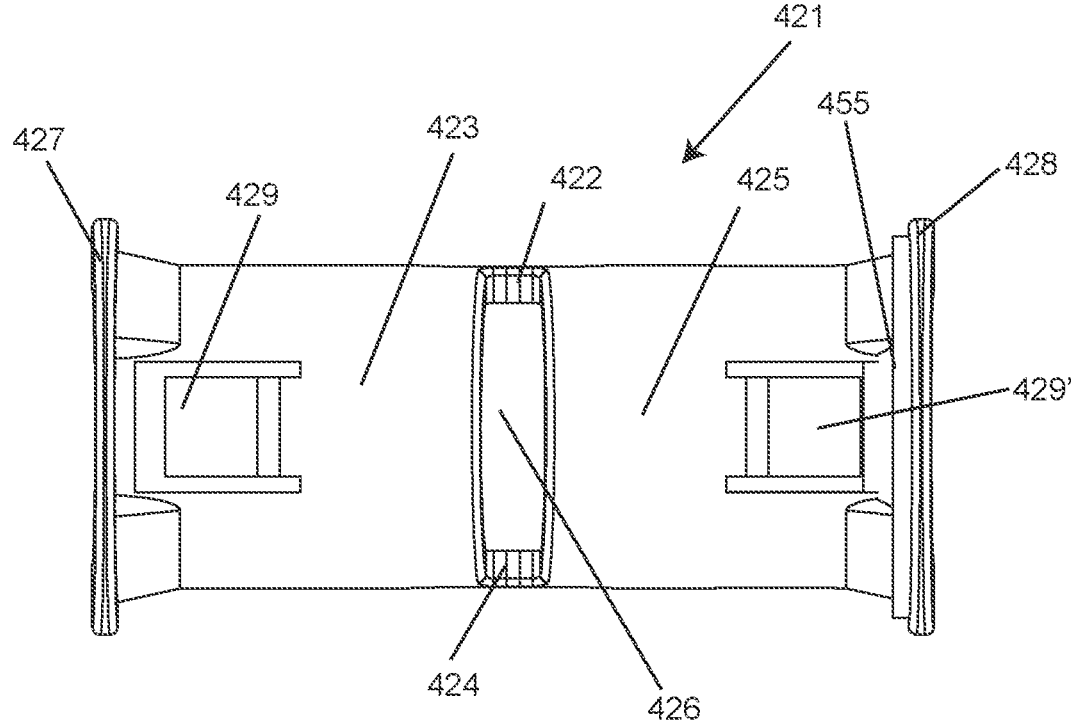
FIG. 35 is an exterior bottom view of the embodiment of FIG. 32.

The alternative embodiment illustrated in FIGS. 32-35 show a different form for the exterior portion 455 of the metallic grounding member 450. As with other embodiments, the interior portion 451 of the metallic grounding member 450 may be smooth or it may have peaks and grooves, and it is conductively connected to the exterior portion 455. And as in other embodiments, a recess may be provided inside one or both of the halves 423, 425 of the unit to receive the interior portion 451 of the metallic grounding member 450. In the embodiment illustrated in FIGS. 32-35, exterior metallic portion or clip 455 may have a shape that is similar to flange 427 (or 428), such that when the metallic grounding member 450 is installed in the clamp 421, clip 455 may be flush against the underside of flange 427 (or 428), as shown in FIGS. 32, 33 and 35. A gap 430 is provided between the exterior portion 155 and deformable tab 429 (or 429') to receive the edge of the knockout hole 47. Thus, when the two halves 423 and 425 of the clamp 421 are folded together and inserted into the knockout hole 47, the exterior portion 455 of the grounding member is located on the inside of the electrical box 45, and is firmly held against the box by tab 429 (or 429') which also holds the clamp itself 421 in place. This provides conductive communication between the electrical box 45 and the exterior portion 455 of the metallic grounding member 450, which extends to the interior portion 451 of the metallic grounding member 450, and to conduit 200 that has been gripped inside the clamp.

It is to be understood that variations and modifications of the present invention may be made without departing from the scope thereof. In particular, and without limitation, each of the various features and/or aspects of each embodiment disclosed herein may be used with other features and/or aspects of other embodiment disclosed herein in different combinations. Other combinations of features of the various embodiments disclosed herein are also included within the scope of the invention. It is also to be understood that the present invention is not to be limited by the specific embodiments disclosed herein, but only in accordance with the appended claims when read in light of the foregoing specification.

What is claimed is:

1. A wire clamp apparatus for use with an electrical box or panel comprising:
a first semi-cylindrical part having a first concave interior surface, a first convex exterior surface, and a first flange located at an end thereof on said first exterior surface;
a second semi-cylindrical part having a second concave interior surface, a second convex exterior surface, and a second flange located at an end thereof on said second exterior surface;
a pair of deformable members provided at opposite ends of said first and second parts that movably connect said first and second parts together wherein an opening is provided between said pair of deformable members; and
a conductive metallic member having a first portion provided on the concave interior surface of at least one of said semi-cylindrical parts and extending through an opening in said at least one part to a second portion on the convex exterior surface thereof.

2. The clamp apparatus of claim 1 further comprising a gripping member provided on an interior surface of at least one of said semi-cylindrical parts.

3. The clamp apparatus of claim 1 wherein the second portion of said metallic member comprises a clip positioned adjacent to the exterior flange on the exterior surface of said at least one part.

4. The clamp apparatus of claim 1 wherein the first portion of said metallic member comprises a concave surface.

5. The clamp apparatus of claim 1 wherein the first portion of said metallic member comprises a sleeve having a plurality of peaks and grooves thereon.

6. The clamp apparatus of claim 5 wherein the peaks and grooves of said first portion of said metallic member are complementary to peaks and grooves on an outer surface of a flexible metallic conduit inserted into said clamp.

7. The clamp apparatus of claim 6 wherein the first portion of said metallic member makes firm contact with said conduit when said first semi-circular part and second semi-cylindrical part are engaged together around said conduit.

8. The clamp apparatus of claim 1 wherein a recess is provided in the interior concave surface of said at least one part for receiving the first portion of said metallic member.

9. The clamp apparatus of claim 1 wherein a recess is provided in the exterior convex surface of said at least one part for at least partially receiving the second portion of said metallic member.

10. The clamp apparatus of claim 1 wherein a second conductive metallic member is provided on the concave interior surface of the other of said at least one semi-cylindrical parts, said second conductive member extending through a second opening in said other part to the convex exterior surface thereof.

11. An electrical clamp for grounding a metallic conduit to an electrical box, comprising:
a foldable semi-cylindrical unit having a convex exterior surface and a concave interior surface, a central opening bisecting the unit into semi-cylindrical halves, and two hinge members located at opposite ends of the central opening which connect the two halves together; and
a conductive metallic member having a first portion located on the concave interior surface of at least one of said semi-cylindrical halves and having a second portion extending through an opening in said at least one semi-cylindrical half to the convex exterior surface thereof.

12. The electrical clamp of claim 11 further comprising a gripping member provided on an interior surface of at least one of said semi-cylindrical halves.

13. The electrical clamp of claim 11 wherein the first portion of said metallic member comprises a sleeve having a plurality of peaks and grooves thereon.

14. The electrical clamp of claim 13 wherein the peaks and grooves of said first portion of said metallic member are complementary to peaks and grooves on an outer surface of said metallic conduit.

15. The electrical clamp of claim 11 wherein a second conductive metallic member is provided on the concave interior surface of the other of said at least one semi-cylindrical halves, said second conductive member extending through a second opening in said other half to the convex exterior surface thereof.

16. A method for securely holding and grounding a flexible metallic conduit in an electrical box comprising the steps of:

a. passing the metallic conduit from outside the electrical box to an interior of the box by extending an end of the conduit through a knockout hole in the box;

b. passing the end of the conduit on the interior of said box through a central opening of a semi-cylindrical unit having a convex exterior surface and a concave interior surface, the opening bisecting the unit into a first semi-cylindrical half and a second semi-cylindrical half, the unit having two hinge members located at opposite ends of said central opening which movably connect the first and second halves together;

c. aligning said conduit with a conductive metallic member having a first portion located on the concave interior surface of at least one of said semi-cylindrical halves, said conductive member extending through an opening in said at least one semi-cylindrical half to a second portion on the convex exterior surface thereof;

d. folding the two semi-cylindrical halves together using said hinges to form a cylinder around the conduit; and e. inserting the formed cylinder into the knockout hole.

17. The method of claim 16 wherein the first portion of said metallic member makes conductive contact with said conduit when said first semi-circular part and second semi-cylindrical part are engaged together around said conduit, and the second portion of said metallic member makes conductive contact with said knockout hole when said cylinder is inserted therein.

18. The method of claim 16 wherein an exterior surface of said conduit comprises peaks and grooves, and the conductive metallic member comprises complementary peaks and grooves, and the step of aligning said metallic member with said conduit includes positioning at least one peak of said metallic member with at least one groove of said conduit and positioning at least one groove of said metallic member with at least one peak of said conduit.

19. The method of claim 16 wherein a gripping member is provided on an interior surface of at least one of said semi-cylindrical halves.

20. The method of claim 16 wherein a second conductive metallic member is provided on the interior surface of the other of said semi-cylindrical halves, said second conductive member extending through a second opening in said other half to the convex exterior surface thereof.

\* \* \* \* \*